(12) United States Patent
Garcia et al.

(10) Patent No.: US 11,470,013 B2
(45) Date of Patent: Oct. 11, 2022

(54) INSTANT NOTIFICATION OF LOAD BALANCE AND RESOURCE SCHEDULING BASED ON RESOURCE CAPACITIES AND EVENT RECOGNITION

(71) Applicant: Oracle International Corporation, Redwood Shores, CA (US)

(72) Inventors: Roger Garcia, Santa Cruz, CA (US); Mitsumasa Sam Hanamoto, Mountain View, CA (US); Neil H. Bui, Milpitas, CA (US); Quang Hang, San Jose, CA (US); Jun Ma, Cupertino, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 23 days.

(21) Appl. No.: 16/840,680

(22) Filed: Apr. 6, 2020

(65) Prior Publication Data
US 2020/0296053 A1    Sep. 17, 2020

Related U.S. Application Data

(63) Continuation of application No. 15/134,907, filed on Apr. 21, 2016, now Pat. No. 10,652,164.

(51) Int. Cl.
*H04L 47/76* (2022.01)
*H04L 47/70* (2022.01)

(52) U.S. Cl.
CPC ............ *H04L 47/76* (2013.01); *H04L 47/822* (2013.01)

(58) Field of Classification Search
CPC ...... H04L 47/76; H04L 47/822; H04L 47/125
See application file for complete search history.

(56) References Cited

U.S. PATENT DOCUMENTS 5,960,411 A    9/1999  Hartman et al.
6,205,466 B1   3/2001  Karp et al.
(Continued)

OTHER PUBLICATIONS

U.S. Appl. No. 15/134,907, Final Office Action dated Nov. 8, 2018, 22 pages.
(Continued)

*Primary Examiner* — Kevin T Bates
*Assistant Examiner* — Ranjan Pant
(74) *Attorney, Agent, or Firm* — Kilpatrick Townsend & Stockton LLP

(57) ABSTRACT

Systems, computer-implemented methods, and computer-readable media for facilitating resource balancing based on resource capacities and resource assignments are disclosed. Electronic communications, received via interfaces, from monitoring devices to identify resource descriptions of resources may be monitored. A resource descriptions data store may be updated to associate each entity of the entities and resource capacities of each resource type of resource types. A first electronic communication, from resource-controlling systems, may be detected. Model data from a model data store may be accessed based on the identified resource descriptions. A first model may be identified based on the model data. A resources assessment corresponding may be generated based on whether a threshold is satisfied based on the first model, a first resource capacity of a first resource type, and the first electronic communication. An electronic notification may be transmitted to the client devices to identify the resources assessment.

20 Claims, 12 Drawing Sheets

(56) References Cited

U.S. PATENT DOCUMENTS

| | | |
|---|---|---|
| 6,308,163 B1 | 10/2001 | Du et al. |
| 7,467,198 B2 | 12/2008 | Goodman et al. |
| 8,479,211 B1 | 7/2013 | Marshall et al. |
| 8,539,197 B1 | 9/2013 | Marshall et al. |
| 8,806,003 B2 | 8/2014 | Brown et al. |
| 8,880,682 B2 | 11/2014 | Bishop et al. |
| 9,075,788 B1* | 7/2015 | Roth .................. G06F 11/1438 |
| 9,329,951 B2 | 5/2016 | Jaisinghani |
| 9,411,969 B2 | 8/2016 | Hecht et al. |
| 9,614,784 B1 | 4/2017 | Houston et al. |
| 9,773,026 B1 | 9/2017 | Tetreault et al. |
| 2004/0098447 A1 | 5/2004 | Verbeke et al. |
| 2010/0229185 A1* | 9/2010 | Howarth ................ H04L 43/00 719/318 |
| 2010/0257015 A1 | 10/2010 | Molander |
| 2011/0055205 A1 | 3/2011 | Scott et al. |
| 2012/0096165 A1 | 4/2012 | Madduri et al. |
| 2012/0198073 A1* | 8/2012 | Srikanth ................ H04L 67/10 709/226 |
| 2013/0085993 A1 | 4/2013 | Li et al. |
| 2014/0122143 A1 | 5/2014 | Fletcher et al. |
| 2014/0229610 A1* | 8/2014 | Shen ..................... H04L 41/147 709/224 |
| 2014/0317283 A1* | 10/2014 | Brown .................. G06F 9/5044 709/224 |
| 2015/0007261 A1 | 1/2015 | Hecht et al. |
| 2016/0065417 A1 | 3/2016 | Sapuram et al. |
| 2019/0281531 A1* | 9/2019 | Scarborough ......... H04L 63/107 |

OTHER PUBLICATIONS

U.S. Appl. No. 15/134,907, Final Office Action dated Jan. 28, 2019, 23 pages.
U.S. Appl. No. 15/134,907, Non-Final Office Action dated Feb. 13, 2018, 19 pages.
U.S. Appl. No. 15/134,907, Non-Final Office Action dated Jul. 12, 2019, 19 pages.

* cited by examiner

INSTANT NOTIFICATION OF LOAD BALANCE AND RESOURCE SCHEDULING BASED ON RESOURCE CAPACITIES AND EVENT RECOGNITION

CROSS-REFERENCE TO RELATED APPLICATIONS

This application is a continuation of U.S. patent application Ser. No. 15/134,907, filed Apr. 21, 2016, entitled "INSTANT NOTIFICATION OF LOAD BALANCE AND RESOURCE SCHEDULING BASED ON RESOURCE CAPACITIES AND EVENT RECOGNITION," the entire contents of which are incorporated herein by reference for all purposes.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

The present disclosure relates in general to facilitating a series of electronic communications to identify a resource with specifications and an availability corresponding to parameters of a request, and, more specifically, but not by way of limitation, to systems, methods, and computer-readable media for instant notification of load balance and resource scheduling based on resource capacities and event recognition.

BACKGROUND

Various devices and performance of various tasks frequently require use of specialized resources. Quantities and capacities of resources may be limited, however, which may limit an extent to which resources may be available for a device and/or a task at a requested time. Such limitations may result in enormous technical challenges, especially when disruptive events impact availability of resources. Generating efficient resource assignment can promote overall resource access and task performance.

Therefore, there is a need in the art for improvements that address such limitations and technical challenges. This and others needs are addressed by the present disclosure.

BRIEF SUMMARY

The present disclosure relates in general to facilitating a series of electronic communications to identify a resource with specifications and an availability corresponding to parameters of a request, and, more specifically, but not by way of limitation, to systems, methods, and computer-readable media for instant notification of load balance and resource scheduling based on resource capacities and event recognition.

In one aspect, a system for facilitating resource balancing based at least in part on resource capacities and resource assignments is disclosed. The system may include any one or combination of the following. One or more interfaces may receive electronic communications from one or more resource-controlling systems, may transmit electronic communications to one or more client devices, and may receive electronic communications from the one or more client devices. A resource monitor may monitor electronic communications, received via the one or more interfaces, from monitoring devices to identify resource descriptions of one or more resources assigned to one or more entities. The resource monitor may update a resource descriptions data store to associate each entity of the one or more entities and resource capacities of each resource type of one or more resource types, based at least in part on one or more of the identified resource descriptions. One or more load-balancing processors may perform any one or combination of the following. A first electronic communication, received via the one or more interfaces from at least one of the one or more resource-controlling systems that corresponds to at least one of the identified resource descriptions may be detected. A first entity associated with the at least one of the identified resource descriptions may be identified. Model data from a model data store may be accessed based at least in part on the at least one of the identified resource descriptions. A first model may be identified, based at least in part on the model data, associated with the at least one of the identified resource descriptions. A resources assessment corresponding to the first entity may be generated. The generating may include determining whether a threshold is satisfied based at least in part on the first model, a first resource capacity of a first resource type of the resource capacities of the one or more resource types, and the first electronic communication. An electronic notification to be transmitted via the one or more interfaces to at least one client device of the one or more client devices to identify the resources assessment corresponding to the first entity may be generated.

In another aspect, a computer-implemented method for facilitating resource balancing based at least in part on resource capacities and resource assignments is disclosed. The computer-implemented method may include any one or combination of the following. Electronic communications, received via one or more interfaces, from monitoring devices to identify resource descriptions of one or more resources assigned to one or more entities may be monitored. The one or more interfaces may receive electronic communications from one or more resource-controlling systems, may transmit electronic communications to one or more client devices, and may receive electronic communications from the one or more client devices. A resource descriptions data store may be updated to associate each entity of the one or more entities and resource capacities of each resource type of one or more resource types, based at least in part on one or more of the identified resource descriptions. A first electronic communication, received via the one or more interfaces from at least one of the one or more resource-controlling systems that corresponds to at least one of the identified resource descriptions may be detected. A first entity associated with the at least one of the identified resource descriptions may be identified. Model data from a model data store may be accessed based at least in part on the at least one of the identified resource descriptions. A first model may be identified, based at least in part on the model data, associated with the at least one of the identified resource descriptions. A resources assessment corresponding to the first entity may be generated. The generating may include determining whether a threshold is satisfied based at least in part on the first model, a first resource capacity of a first resource type of the resource capacities of the one or more resource types, and the first electronic communication. An electronic notification to be transmitted via the one or more interfaces to at least one client device of the one or more client devices to identify the resources assessment corresponding to the first entity may be generated.

In yet another aspect, one or more non-transitory, processor-readable media storing instructions are disclosed. The instructions, when executed by a data-processing system, may cause the data-processing system to perform any one or combination of the following. Electronic communications, received via one or more interfaces, from monitoring devices to identify resource descriptions of one or more resources assigned to one or more entities may be monitored. The one or more interfaces may receive electronic communications from one or more resource-controlling systems, may transmit electronic communications to one or more client devices, and may receive electronic communications from the one or more client devices. A resource descriptions data store may be updated to associate each entity of the one or more entities and resource capacities of each resource type of one or more resource types, based at least in part on one or more of the identified resource descriptions. A first electronic communication, received via the one or more interfaces from at least one of the one or more resource-controlling systems that corresponds to at least one of the identified resource descriptions may be detected. A first entity associated with the at least one of the identified resource descriptions may be identified. Model data from a model data store may be accessed based at least in part on the at least one of the identified resource descriptions. A first model may be identified, based at least in part on the model data, associated with the at least one of the identified resource descriptions. A resources assessment corresponding to the first entity may be generated. The generating may include determining whether a threshold is satisfied based at least in part on the first model, a first resource capacity of a first resource type of the resource capacities of the one or more resource types, and the first electronic communication. An electronic notification to be transmitted via the one or more interfaces to at least one client device of the one or more client devices to identify the resources assessment corresponding to the first entity may be generated.

In various embodiments, the one or more resources may include a subset of resources, and each resource of the subset of resources may be respectively associated with a unique geographical location that is unique with respect to other geographical locations associated with other resources in the subset of resources. In various embodiments, a schedule subsystem and/or a data-processing system may monitor electronic communications, received via the one or more interfaces, from resource controlling systems to identify updates to timetables of the one or more resources that indicate capacities to fulfill tasks with respect to particular times, and may update a timetable data store based at least in part on the identified updates to the timetables. The generating the resources assessment may be based at least in part on the identified updates.

In various embodiments, a resource specification may be identified based at least in part on the first model, and may include a quantity requirement and a time requirement. The determining whether a threshold is satisfied may be further based at least in part on the resource specification. In various embodiments, the electronic communications may be received via the one or more interfaces from one or more monitoring systems. A second electronic communication, received via the one or more interfaces from at least one of the one or more monitoring systems that indicates an event may be detected. The resources assessment may be generated based at least in part on the event.

In various embodiments, the resources assessment corresponding to the first entity may include a specification of a change to a resource assignment to the first entity. A second electronic communication, received via the one or more interfaces from the at least one client device that indicates acceptance of the change to the resource assignment to the first entity may be detected. In various embodiments, electronic communications may be transmitted via the one or more interfaces to one or more resource-controlling systems. A second electronic notification to be transmitted via the one or more interfaces to the at least one of the one or more resource-controlling systems to specify the change to the resource assignment to the first entity may be generated.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the following appended figures.

Figure 1:
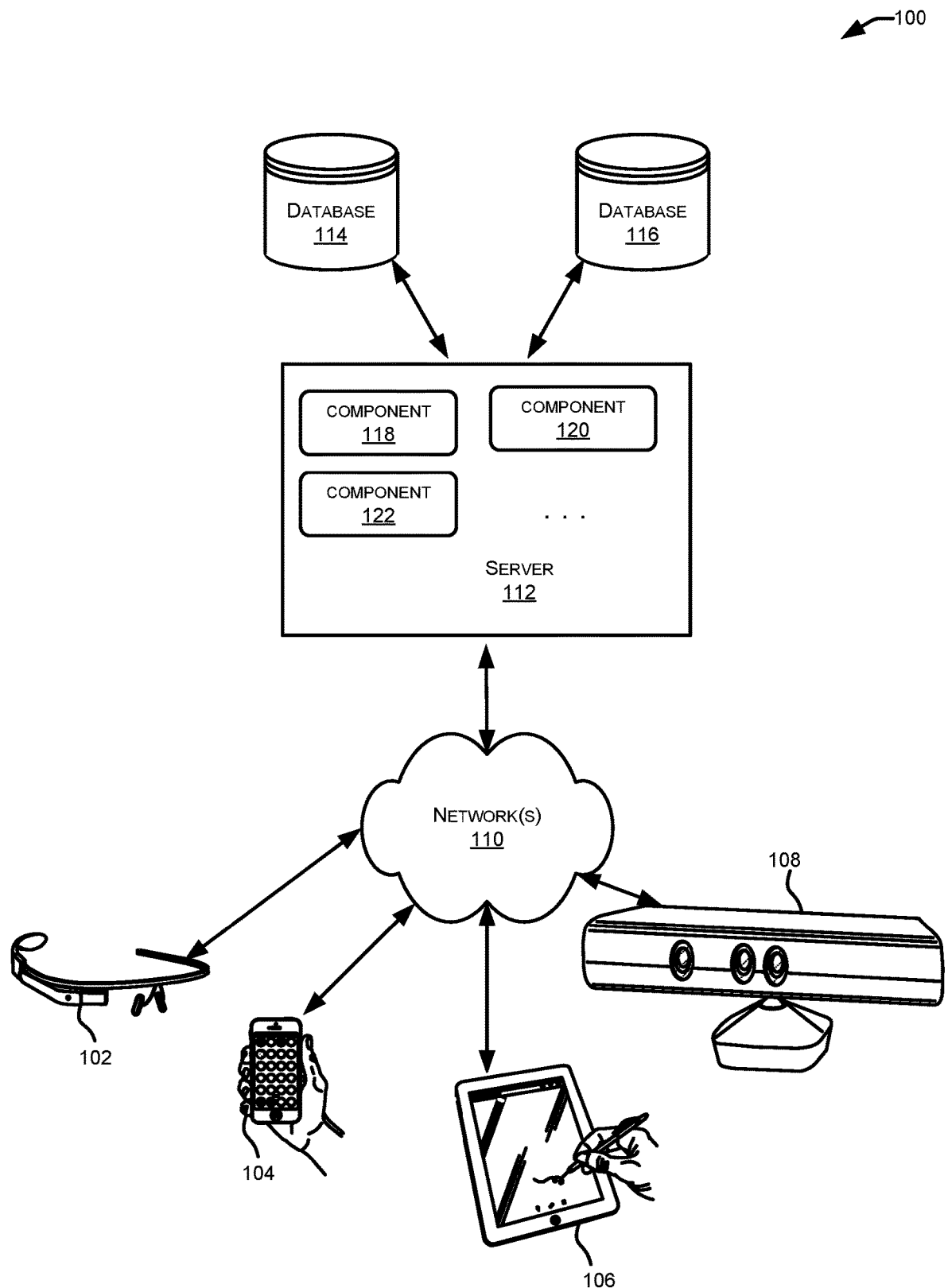
FIG. 1 depicts a simplified diagram of a distributed system, in accordance with certain embodiments of the present disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various embodiments will now be discussed in greater detail with reference to the accompanying figures, beginning with FIG. 1.

FIG. 1 depicts a simplified diagram of a distributed system 100 for implementing certain embodiments in accordance with present disclosure. In the illustrated embodiment, distributed system 100 includes one or more client computing devices 102, 104, 106, and 108, which are configured to execute and operate a client application such as a web browser, proprietary client (e.g., Oracle Forms), or the like over one or more network(s) 110. Server 112 may be communicatively coupled with remote client computing devices 102, 104, 106, and 108 via network 110.

In various embodiments, server 112 may be adapted to run one or more services or software applications provided by one or more of the components of the system. In some embodiments, these services may be offered as web-based or cloud services or under a Software as a Service (SaaS) model to the users of client computing devices 102, 104, 106, and/or 108. Users operating client computing devices 102, 104, 106, and/or 108 may in turn utilize one or more client applications to interact with server 112 to utilize the services provided by these components.

In the configuration depicted in the figure, the software components 118, 120 and 122 of system 100 are shown as being implemented on server 112. In other embodiments, one or more of the components of system 100 and/or the services provided by these components may also be implemented by one or more of the client computing devices 102, 104, 106, and/or 108. Users operating the client computing devices may then utilize one or more client applications to use the services provided by these components. These components may be implemented in hardware, firmware, software, or combinations thereof. It should be appreciated that various different system configurations are possible, which may be different from distributed system 100. The embodiment shown in the figure is thus one example of a distributed system for implementing an embodiment system and is not intended to be limiting.

Client computing devices 102, 104, 106, and/or 108 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 102, 104, 106, and 108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 110.

Although exemplary distributed system 100 is shown with four client computing devices, any number of client computing devices may be supported. Other devices, such as devices with sensors, etc., may interact with server 112.

Network(s) 110 in distributed system 100 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 110 can be a local area network (LAN), such as one based on Ethernet, Token-Ring and/or the like. Network(s) 110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 102.11 suite of protocols, Bluetooth®, and/or any other wireless protocol); and/or any combination of these and/or other networks.

Server 112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 112 may be adapted to run one or more services or software applications described in the foregoing disclosure. For example, server 112 may correspond to a server for performing processing described above according to an embodiment of the present disclosure.

Server 112 may run an operating system including any of those discussed above, as well as any commercially available server operating system. Server 112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 112 may include one or more applications to analyze and consolidate data feeds and/or event updates received from users of client computing devices 102, 104, 106, and 108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 112 may also include one or more applications to display the data feeds and/or real-time events via one or more display devices of client computing devices 102, 104, 106, and 108.

Distributed system 100 may also include one or more databases 114 and 116. Databases 114 and 116 may reside in a variety of locations. By way of example, one or more of databases 114 and 116 may reside on a non-transitory storage medium local to (and/or resident in) server 112. Alternatively, databases 114 and 116 may be remote from server 112 and in communication with server 112 via a network-based or dedicated connection. In one set of embodiments, databases 114 and 116 may reside in a storage-area network (SAN). Similarly, any necessary files for performing the functions attributed to server 112 may be stored locally on server 112 and/or remotely, as appropriate. In one set of embodiments, databases 114 and 116 may include relational databases, such as databases provided by Oracle, that are adapted to store, update, and retrieve data in response to SQL-formatted commands.

Figure 2:
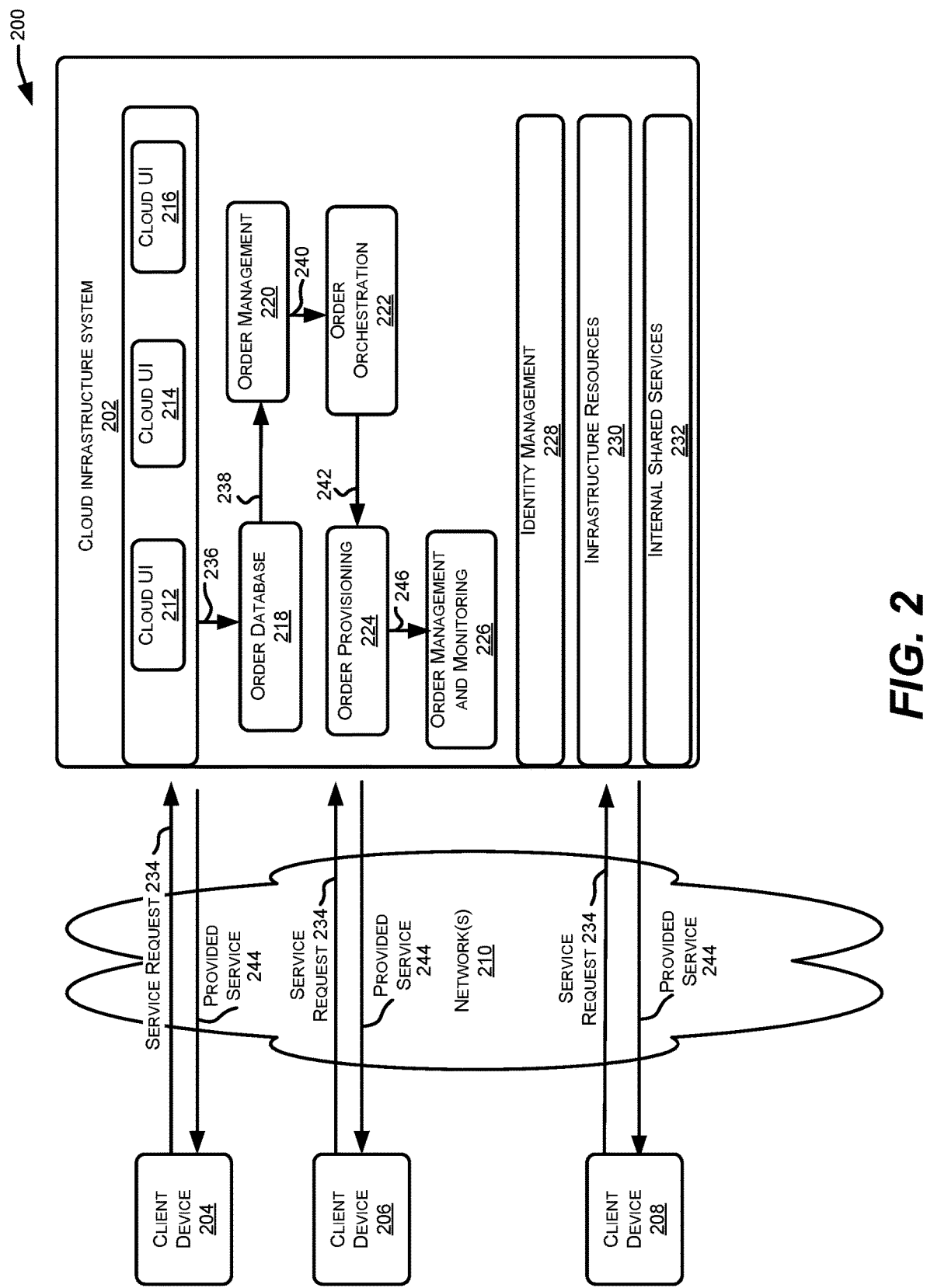
FIG. 2 is a simplified block diagram of components of a system environment by which services provided by the components of an embodiment system may be offered as cloud services, in accordance with an embodiment of the present disclosure.

FIG. 2 is a simplified block diagram of one or more components of a system environment 200 by which services provided by one or more components of a system may be offered as cloud services, in accordance with certain embodiments of the present disclosure. In the illustrated embodiment, system environment 200 includes one or more client computing devices 204, 206, and 208 that may be used by users to interact with a cloud infrastructure system 202 that provides cloud services. The client computing devices may be configured to operate a client application such as a web browser, a proprietary client application (e.g., Oracle Forms), or some other application, which may be used by a user of the client computing device to interact with cloud infrastructure system 202 to use services provided by cloud infrastructure system 202.

It should be appreciated that cloud infrastructure system 202 depicted in the figure may have other components than those depicted. Further, the embodiment shown in the figure is only one example of a cloud infrastructure system that may incorporate an embodiment of the invention. In some other embodiments, cloud infrastructure system 202 may have more or fewer components than shown in the figure, may combine two or more components, or may have a different configuration or arrangement of components.

Client computing devices 204, 206, and 208 may be devices similar to those described above for 102, 104, 106, and 108. Although exemplary system environment 200 is shown with three client computing devices, any number of client computing devices may be supported. Other devices such as devices with sensors, etc. may interact with cloud infrastructure system 202.

Network(s) 210 may facilitate communications and exchange of data between clients 204, 206, and 208 and cloud infrastructure system 202. Each network may be any type of network familiar to those skilled in the art that can support data communications using any of a variety of commercially-available protocols, including those described above for network(s) 110. Cloud infrastructure system 202 may comprise one or more computers and/or servers that may include those described above for server 112.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 202 may be adapted to automatically provision, manage and track a customer's subscription to services offered by cloud infrastructure system 202. Cloud infrastructure system 202 may provide the cloud services via different deployment models. For example, services may be provided under a public cloud model in which cloud infrastructure system 202 is owned by an organization selling cloud services (e.g., owned by Oracle) and the services are made available to the general public or different industry enterprises. As another example, services may be provided under a private cloud model in which cloud infrastructure system 202 is operated solely for a single organization and may provide services for one or more entities within the organization. The cloud services may also be provided under a community cloud model in which cloud infrastructure system 202 and the services provided by cloud infrastructure system 202 are shared by several organizations in a related community. The cloud services may also be provided under a hybrid cloud model, which is a combination of two or more different models.

In some embodiments, the services provided by cloud infrastructure system 202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 202. Cloud infrastructure system 202 then performs processing to provide the services in the customer's subscription order.

In some embodiments, the services provided by cloud infrastructure system 202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 202 may also include infrastructure resources 230 for providing the resources used to provide various services to customers of the cloud infrastructure system. In one embodiment, infrastructure resources 230 may include pre-integrated and optimized combinations of hardware, such as servers, storage, and networking resources to execute the services provided by the PaaS platform and the SaaS platform. In some embodiments, resources in cloud infrastructure system 202 may be shared by multiple users and dynamically re-allocated per demand. Additionally, resources may be allocated to users in different time zones. For example, cloud infrastructure system 230 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 232 may be provided that are shared by different components or modules of cloud infrastructure system 202 and by the services provided by cloud infrastructure system 202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like. In certain embodiments, cloud infrastructure system 202 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 202, and the like.

In certain embodiments, as depicted in the figure, cloud management functionality may be provided by one or more modules, such as an order management module 220, an order orchestration module 222, an order provisioning module 224, an order management and monitoring module 226, and an identity management module 228. These modules may include or be provided using one or more computers and/or servers, which may be general purpose computers, specialized server computers, server farms, server clusters, or any other appropriate arrangement and/or combination.

In exemplary operation 234, a customer using a client device, such as client device 204, 206 or 208, may interact with cloud infrastructure system 202 by requesting one or more services provided by cloud infrastructure system 202 and placing an order for a subscription for one or more services offered by cloud infrastructure system 202. In certain embodiments, the customer may access a cloud User Interface (UI), cloud UI 212, cloud UI 214 and/or cloud UI 216 and place a subscription order via these UIs. The order information received by cloud infrastructure system 202 in response to the customer placing an order may include information identifying the customer and one or more services offered by the cloud infrastructure system 202 that the customer intends to subscribe to.

After an order has been placed by the customer, the order information is received via the cloud UIs, 212, 214 and/or 216. At operation 236, the order is stored in order database 218. Order database 218 can be one of several databases operated by cloud infrastructure system 218 and operated in conjunction with other system elements. At operation 238, the order information is forwarded to an order management module 220. In some instances, order management module 220 may be configured to perform billing and accounting functions related to the order, such as verifying the order, and upon verification, booking the order.

At operation 240, information regarding the order is communicated to an order orchestration module 222. Order orchestration module 222 may utilize the order information to orchestrate the provisioning of services and resources for the order placed by the customer. In some instances, order orchestration module 222 may orchestrate the provisioning of resources to support the subscribed services using the services of order provisioning module 224.

In certain embodiments, order orchestration module 222 enables the management of business processes associated with each order and applies business logic to determine whether an order should proceed to provisioning. At operation 242, upon receiving an order for a new subscription, order orchestration module 222 sends a request to order provisioning module 224 to allocate resources and configure those resources needed to fulfill the subscription order. Order provisioning module 224 enables the allocation of resources for the services ordered by the customer. Order provisioning module 224 provides a level of abstraction between the cloud services provided by cloud infrastructure system 200 and the physical implementation layer that is used to provision the resources for providing the requested services. Order orchestration module 222 may thus be isolated from implementation details, such as whether or not services and resources are actually provisioned on the fly or pre-provisioned and only allocated/assigned upon request.

At operation 244, once the services and resources are provisioned, a notification of the provided service may be sent to customers on client devices 204, 206, and/or 208 by order provisioning module 224 of cloud infrastructure system 202. At operation 246, the customer's subscription order may be managed and tracked by an order management and monitoring module 226. In some instances, order management and monitoring module 226 may be configured to collect usage statistics for the services in the subscription order, such as the amount of storage used, the amount data transferred, the number of users, and the amount of system up time and system down time.

In certain embodiments, cloud infrastructure system 200 may include an identity management module 228. Identity management module 228 may be configured to provide identity services, such as access management and authorization services in cloud infrastructure system 200. In some embodiments, identity management module 228 may control information about customers who wish to utilize the services provided by cloud infrastructure system 202. Such information can include information that authenticates the identities of such customers and information that describes which actions those customers are authorized to perform relative to various system resources (e.g., files, directories, applications, communication ports, memory segments, etc.). Identity management module 228 may also include the management of descriptive information about each customer and about how and by whom that descriptive information can be accessed and modified.

Figure 3:
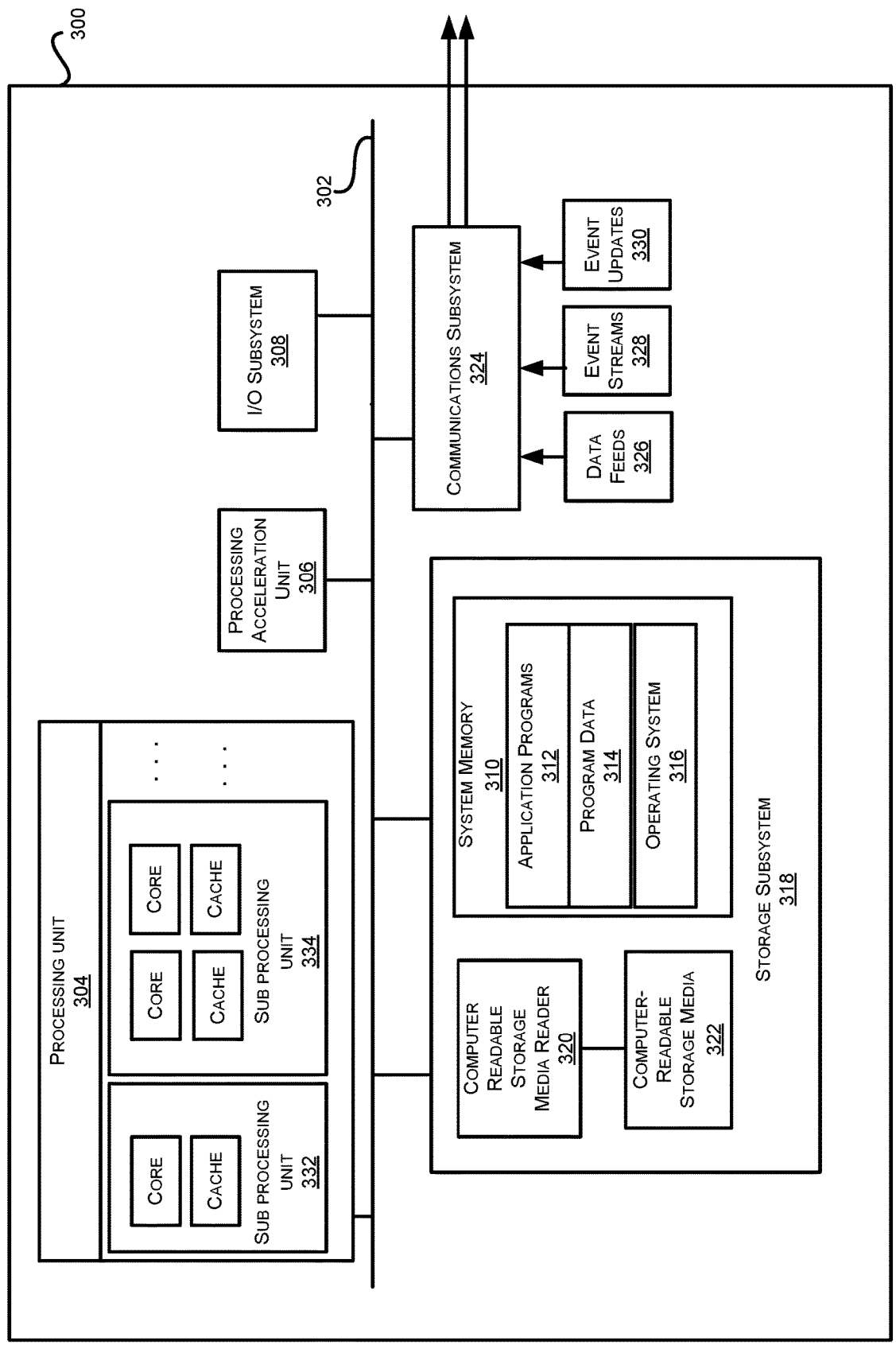
FIG. 3 illustrates an exemplary computer system, in accordance with certain embodiments of the present disclosure.

FIG. 3 illustrates an exemplary computer system 300, in which various embodiments of the present invention may be implemented. The system 300 may be used to implement any of the computer systems described herein. As shown in the figure, computer system 300 includes a processing unit 304 that communicates with a number of peripheral subsystems via a bus subsystem 302. These peripheral subsystems may include a processing acceleration unit 306, an I/O subsystem 308, a storage subsystem 318 and a communications subsystem 324. Storage subsystem 318 includes tangible computer-readable storage media 322 and a system memory 310.

Bus subsystem 302 provides a mechanism for letting the various components and subsystems of computer system 300 communicate with each other as intended. Although bus subsystem 302 is shown schematically as a single bus, alternative embodiments of the bus subsystem may utilize multiple buses. Bus subsystem 302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 304, which can be implemented as one or more integrated circuits (e.g., a conventional microprocessor or microcontroller), controls the operation of computer system 300. One or more processors may be included in processing unit 304. These processors may include single core or multicore processors. In certain embodiments, processing unit 304 may be implemented as one or more independent processing units 332 and/or 334 with single or multicore processors included in each processing unit. In other embodiments, processing unit 304 may also be implemented as a quad-core processing unit formed by integrating two dual-core processors into a single chip.

In various embodiments, processing unit 304 can execute a variety of programs in response to program code and can maintain multiple concurrently executing programs or processes. At any given time, some or all of the program code to be executed can be resident in processor(s) 304 and/or in storage subsystem 318. Through suitable programming, processor(s) 304 can provide various functionalities described above. Computer system 300 may additionally include a processing acceleration unit 306, which can include a digital signal processor (DSP), a special-purpose processor, and/or the like. In some embodiments, the processing acceleration unit 306 may include or work in conjunction with an acceleration engine such as that disclosed herein to improve computer system functioning.

I/O subsystem 308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 300 may comprise a storage subsystem 318 that comprises software elements, shown as being currently located within a system memory 310. System memory 310 may store program instructions that are loadable and executable on processing unit 304, as well as data generated during the execution of these programs. Depending on the configuration and type of computer system 300, system memory 310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 304. In some implementations, system memory 310 may include multiple different types of memory, such as static random access memory (SRAM) or dynamic random access memory (DRAM). In some implementations, a basic input/output system (BIOS), containing the basic routines that help to transfer information between elements within computer system 300, such as during start-up, may typically be stored in the ROM. By way of example, and not limitation, system memory 310 also illustrates application programs 312, which may include client applications, Web browsers, mid-tier applications, relational database management systems (RDBMS), etc., program data 314, and an operating system 316. By way of example, operating system 316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 30 OS, and Palm® OS operating systems.

Storage subsystem 318 may also provide a tangible computer-readable storage medium for storing the basic programming and data constructs that provide the functionality of some embodiments. Software (programs, code modules, instructions) that when executed by a processor provide the functionality described above may be stored in storage subsystem 318. These software modules or instructions may be executed by processing unit 304. Storage subsystem 318 may also provide a repository for storing data used in accordance with the present invention.

Storage subsystem 300 may also include a computer-readable storage media reader 320 that can further be connected to computer-readable storage media 322. Together and, optionally, in combination with system memory 310, computer-readable storage media 322 may comprehensively represent remote, local, fixed, and/or removable storage devices plus storage media for temporarily and/or more permanently containing, storing, transmitting, and retrieving computer-readable information.

Computer-readable storage media 322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 300.

By way of example, computer-readable storage media 322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 322 may include, but is not limited to, Zip® drives, flash memory cards, universal serial bus (USB) flash drives, secure digital (SD) cards, DVD disks, digital video tape, and the like. Computer-readable storage media 322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 300.

Communications subsystem 324 provides an interface to other computer systems and networks. Communications subsystem 324 serves as an interface for receiving data from and transmitting data to other systems from computer system 300. For example, communications subsystem 324 may enable computer system 300 to connect to one or more devices via the Internet. In some embodiments communications subsystem 324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 324 can provide wired network connectivity (e.g., Ethernet) in addition to or instead of a wireless interface.

In some embodiments, communications subsystem 324 may also receive input communication in the form of structured and/or unstructured data feeds 326, event streams 328, event updates 330, and the like on behalf of one or more users who may use computer system 300. By way of example, communications subsystem 324 may be configured to receive data feeds 326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 324 may also be configured to receive data in the form of continuous data streams, which may include event streams 328 of real-time events and/or event updates 330, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like. Communications subsystem 324 may also be configured to output the structured and/or unstructured data feeds 326, event streams 328, event updates 330, and the like to one or more databases that may be in communication with one or more streaming data source computers coupled to computer system 300.

Computer system 300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system. Due to the ever-changing nature of computers and networks, the description of computer system 300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Figure 4:
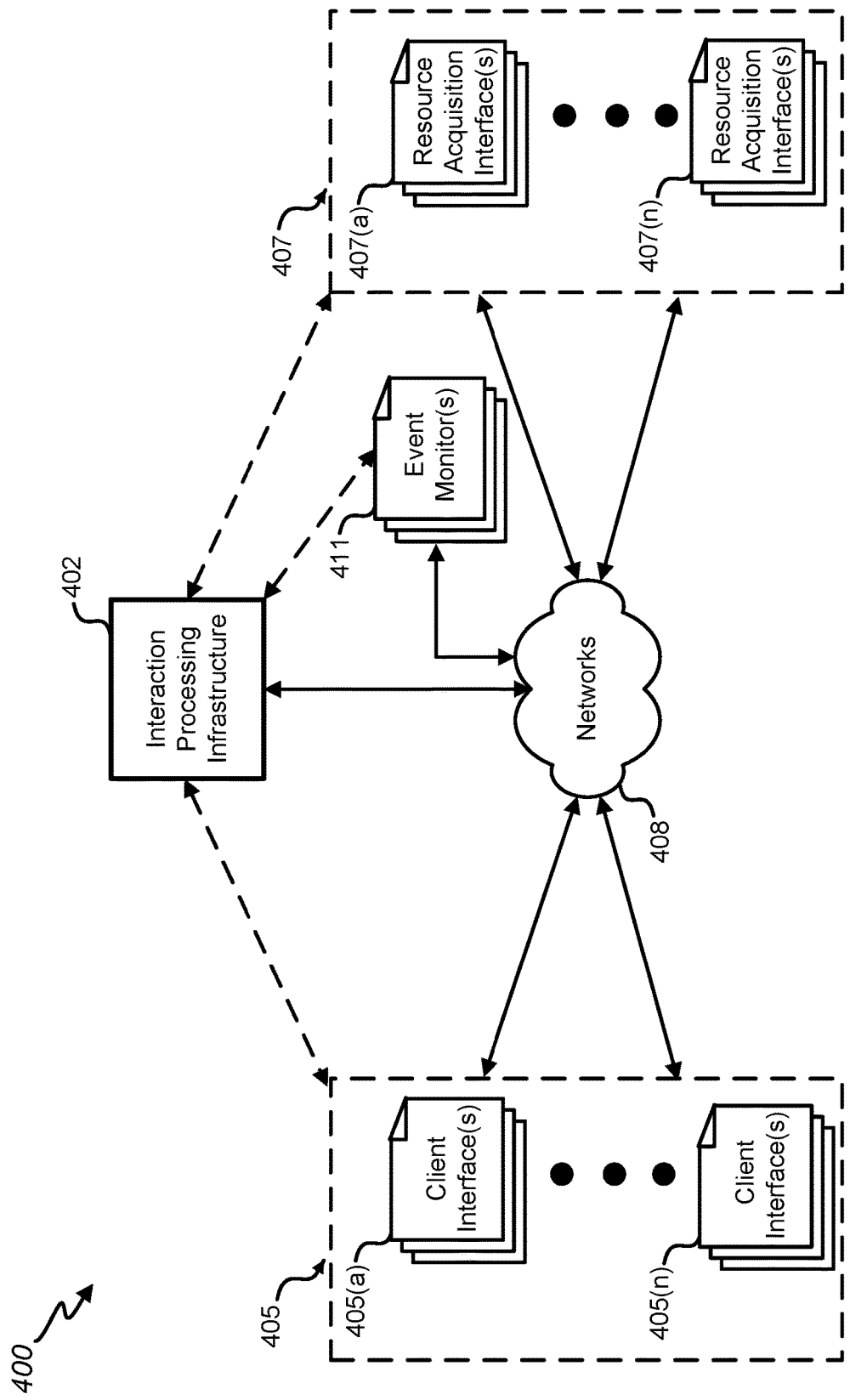
FIG. 4 depicts a high-level block diagram of a resource management system, in accordance with certain embodiments of the present disclosure.

FIG. 4 depicts a high-level block diagram of a resource management system 400, in accordance with certain embodiments of the present disclosure. The resource management system 400 may facilitate resource balancing and notifications relating to resource balancing based at least in part on resource capacities assignments of tasks to resources. In some embodiments, the resource management system 400 may facilitate resource balancing and notifications relating to resource balancing based at least in part on event recognition, as well.

The resource management system 400 may include an interaction processing infrastructure 402. The interaction processing infrastructure 402 may aggregate and/or determine forecasted resource information and instantaneous resource state information to dynamically assess resource balance and demand. The interaction processing infrastructure 402 may intelligently manage loads based at least in part on platform models, which may define requirements for platform components.

In some embodiments, the interaction processing infrastructure 402 may provide resource management control via onsite and/or offsite resource management gateways and controls. As depicted, the resource management system 400 may allow for interaction between two or more of an interaction processing infrastructure 402 (sometimes referenced herein as interaction infrastructure 402), client interfaces 405, resource data acquisition interfaces 407, and/or event monitors 411. As depicted, components of the resource management system 400 may be communicatively coupled or couplable to one or more networks 408, which may include a common enterprise network according to certain embodiments.

The one or more networks 408 may be a suitable means to facilitate data transfer in the resource management system 400 and could include multiple networks and/or network components. In various embodiments, the one or more networks 408 may be implemented with, without limitation, one or more of the Internet, a wide area network (WAN), a local area network (LAN) such as one based on Ethernet, a virtual private network (VPN), an intranet, an extranet, Token-Ring and/or the like, an infra-red network, a wireless network (e.g., a network operating under Bluetooth®, any of the Institute of Electrical and Electronics (IEEE) 802.11 suite of protocols, and/or any other wireless protocol), a wireless local area network (WLAN), a cellular network, such as through 4G, 3G, GSM (Global System for Mobile Communications), etc., another wireless network, a gateway, a public switched telephone network (PSTN), and/or any other appropriate architecture or system that facilitates the communication of signals, data, and/or message. In various embodiments, the one or more networks 408 may transmit data using any suitable communication protocol(s), such as, without limitation, TCP/IP (transmission control protocol/Internet protocol), SNA (systems network architecture), IPX (Internet packet exchange), AppleTalk, and/or the like. In various embodiments, the one or more networks 408 and its various components may be implemented using hardware, software, and communications media such wires, optical fibers, microwaves, radio waves, and other electromagnetic and/or optical carriers; and/or any combination of the foregoing and/or the like. In some embodiments, the network 408 may include a telephone network that may be circuit switched, package switched, or partially circuit switched and partially package switched.

In various embodiments, the interaction processing infrastructure 402 may include a set of devices configured to process, transform, encode, translate, send, receive, retrieve, detect, generate, compute, organize, categorize, qualify, model, store, display, present, handle, or use information and/or data suitable for the embodiments described herein. The interaction processing infrastructure 402 may include a server system comprising one or more servers. For example, servers of the infrastructure 402 may be used to store software programs and data. Software implementing the systems and methods described herein may be stored on storage media in the servers. Thus, the software may be run from the storage media in the servers. In some embodiment, software implementing the systems and methods described herein may be stored on storage media of other devices described herein.

Figure 5:
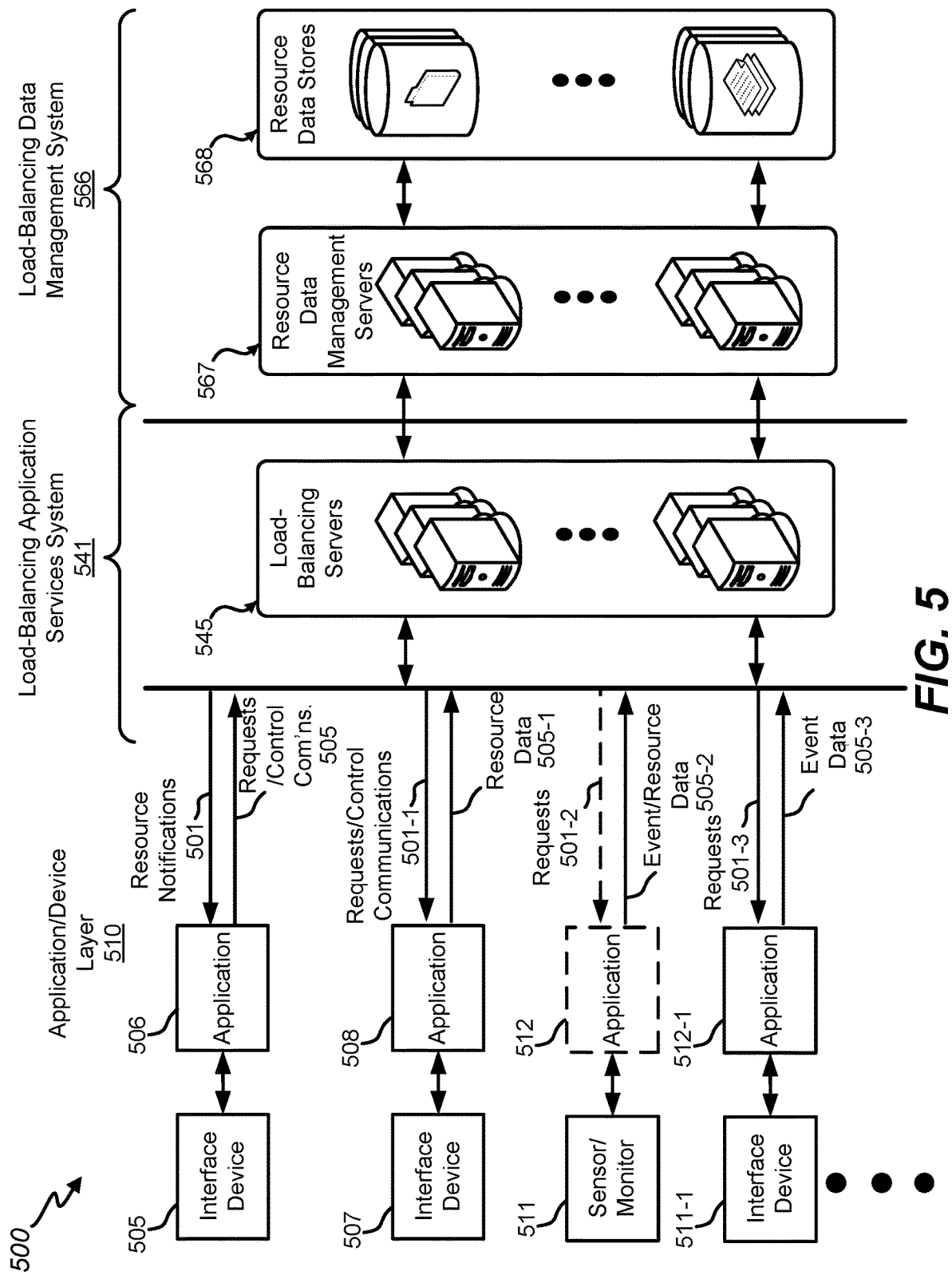
FIG. 5 shows a diagram of a portion of an architecture stack of the interaction infrastructure, in accordance with certain embodiments of the present disclosure.

In some embodiments, the resource management system 400 may be a distributed system for implementing features of various embodiments disclosed herein. The resource management system 400 may include or otherwise interface with one or more interface devices 505 and/or 507 depicted in FIG. 5. FIG. 5 shows a diagram of a portion of an architecture stack 500 of the interaction infrastructure 402, in accordance with certain embodiments of the present disclosure. At least some of the interface devices 505 and/or 507 may be configured to execute and operate a client application such as a web browser, proprietary client, and/or the like over one or more networks 408. The interaction processing infrastructure 402, which may include a server system including one or more servers in some embodiments, may be communicatively coupled with remote interface devices 505 and/or 507 via the network 408.

In various embodiments, the interaction processing infrastructure 402 may be adapted to run one or more services or software applications provided by one or more of the components of the system. In some embodiments, these services may be offered as web-based or cloud services or under a Software as a Service (SaaS) model to the users of remote interface devices 505 and/or 507. Users operating remote interface devices 505 and/or 507 may in turn utilize one or more client applications to interact with the interaction processing infrastructure 402 to utilize the services provided by these components.

Software components of the resource management system 400 may be implemented on the interaction processing infrastructure 402—e.g., on one or more servers. In addition or in the alternative, one or more of the components of resource management system 400 and/or the services provided by these components may be implemented by one or more of the interface devices 505 and/or 507. Users operating the interface devices 505 and/or 507 may then utilize one or more client applications to use the services provided by these components. These components may be implemented in hardware, firmware, software, or combinations thereof. It should be appreciated that various different system configurations are possible, which may be different from the resource management system 400. The embodiment shown in the figure is thus one example for implementing certain embodiments and is not intended to be limiting.

Referring again to FIG. 4, the infrastructure 402 may include one or more load-balancing servers, data acquisition servers, application servers, resource data management servers, and/or the like, one or more of which may include one or more load-balancing processors. The server system may be located remotely and/or locally with respect to one or more sites that generate, maintain, supply, and/or otherwise provide resources. The server system may acquire information, manage, and/or control site components of one or more sites, e.g., via resource acquisition interfaces 407. For example, resource descriptions, resource states, resource attributes, resource forecasts, and/or the like to push and/or pulled from one or more sites via resource acquisition interfaces 407. Some embodiments may include implementing one or more on-site gateways providing information, management, and/or control of site components.

In certain embodiments, the interaction processing infrastructure 402 may be communicatively coupled or couplable to one or more data sources via one or more event monitors 411. The server system may correspond to, include, or otherwise utilize one or more event monitors 411 to actively retrieve and/or otherwise receive data from one or more data sources. The one or more data sources may include any suitable source of data to facilitate embodiments disclosed further herein.

In various embodiments, the data from the one or more data sources may be retrieved and/or received by the interaction processing infrastructure 402 via the one or more event monitors 411 through network(s) 408 and/or through any other suitable means of transferring data. In some embodiments, the interaction processing infrastructure 402 and the data sources could use any suitable means for direct communication. According to certain embodiments, data may be actively gathered and/or pulled from one or more data sources, for example, by accessing a third party repository and/or by "crawling" various repositories. Certain data pulled and/or pushed from the one or more data sources may be transformed and the transformed data and/or other data generated as disclosed herein.

In various embodiments, the one or more event monitors 411 may include one or more gateways and/or application programming interfaces (APIs) that define protocols and routines for interfacing with the data sources. The APIs may specify application programming interface (API) calls to/from data source systems. Some embodiments may employ one or more webAPIs. In some embodiments, the APIs may include a plug-in to integrate with an application of a data source system. The one or more event monitors 411, in some embodiments, could use a number of API translation profiles configured to allow interface with the one or more additional applications of the data sources to access data (e.g., a database or other data store) of the data sources. The API translation profiles may translate the protocols and routines of the data source system to integrate at least temporarily with the system and allow communication with the system by way of API calls. Data, as referenced herein, may correspond to any one or combination of raw data, unstructured data, structured data, information, and/or content which may include media content, text, documents, files, instructions, code, executable files, images, video, audio, and/or any other suitable content suitable for embodiments of the present disclosure.

According to certain embodiments, the interaction processing infrastructure 402 may include or provide a resource management platform. A manager may receive notifications and/or access the interaction processing infrastructure 402 via one or more client interfaces 405. In some embodiments, resource acquisition interfaces 407 may interface with resource-controlling systems at remote sites.

In some embodiments, a client interface 405 and/or a resource acquisition interface 407 may include a web interface, which may, for example, allow for real-time and scheduled changing of resource assignments and schedules. The client interfaces 405 and/or resource data acquisition interfaces 407 may allow for transfer of and access to information in accordance with certain embodiments disclosed herein. In various embodiments, the client interfaces(s) 405 and/or resource acquisition interface(s) 407 may include one or more suitable input/output modules and/or other system/devices operable to serve as an interface between users and the resource management platform. The client interfaces 405 and/or resource data acquisition interfaces 407 may facilitate communication over the network 408 using any suitable transmission/communication protocol and/or standard.

In various embodiments, the interaction infrastructure 402 may include, provide, and/or be configured for operation with the client interfaces 405 and/or resource data acquisition interfaces 407, for example, by making available and/or communicating with one or more of a website, a web page, a web portal, a web application, a mobile application, enterprise software, and/or any suitable application software. In some embodiments, a client interfaces 405 and/or resource acquisition interface 407 may include an API to interact with the interaction infrastructure 402.

In some embodiments, the client interfaces 405 and/or resource acquisition interface 407 may include or work with an application made available to one or more interfaces, such as a mobile application as discussed herein. In some embodiments, the client interfaces 405 and/or resource acquisition interface 407 may cause a web page to be displayed on a browser. The web page(s) may display output and receive input from a user (e.g., by using Web-based forms, via hyperlinks, electronic buttons, etc.). A variety of techniques can be used to create the web pages and/or display/receive information, such as JavaScript, Java applications or applets, JSON, dynamic HTML and/or AJAX technologies. Accordingly, the interaction processing infrastructure 402 may have web site(s)/portal(s) giving access to such information, such as a manager portal. In various embodiments, a client interfaces 405 and/or a resource acquisition interface 407 may include providing one or more display screen images that may each include one or more user interface elements. A user interface may include any text, image, and/or device that can be displayed on a display screen for providing information to a user and/or for receiving user input. A user interface may include one or more widgets, windows, dashboards, text, text boxes, text fields, tables, grids, charts, hyperlinks, buttons, lists, combo boxes, checkboxes, radio buttons, and/or the like. In certain embodiments, a client interfaces 405 and/or a resource acquisition interface 407 may include a computing device of a resource manager and/or another end user. In certain embodiments, a client interfaces 405 and/or a resource acquisition interface 407 may include a mobile computing device that may be any portable device suitable for sending and receiving information over a network in accordance with embodiments described herein.

Referring again to FIG. 5, the portion 500 at least partially includes an application/device layer 510, as well as a load-balancing application services system 541 and a load-balancing data management system 566 of the interaction infrastructure 402. In some embodiments, the load-balancing application services system 541 may correspond at least partially to an interface layer 525 and a load-balancing application services management layer 540. In some embodiments, the data management system 566 may correspond at least partially to a load-balancing data management layer 565.

The load-balancing application services system 541 may interface with the application/device layer 510 and the load-balancing data management system 566. In some embodiments, the load-balancing application services system 541 may include at least part of the application/device layer 510. The load-balancing application services system 541 could be a middle tier of the interaction infrastructure 402 in some embodiments, with the load-balancing data management system 566 corresponding to a back-end in some embodiments.

In some embodiments, the load-balancing application services system 541 and the load-balancing data management system 566 each may be or include a load-balancing server system 542 and a resource data management server system 567, respectively, that include one or more servers. Other embodiments may include only a single server system. In some embodiments, the load-balancing application services system 541 and the load-balancing data management system 566 may be integrated. In various embodiments, the server systems 542, 567 may include one or more computers, specialized server computers (including, by way of example, load-balancing servers, load control servers, other site control servers, data acquisition servers, application servers, data management servers, PC (personal computer) servers, UNIX® servers, mid-range servers, mainframe computers, rack-mounted servers, etc.), server farms, server clusters, or any other appropriate arrangement and/or combination. In various embodiments, the server systems 542, 567 may be adapted to run one or more services, operations, processing, or software applications described herein. The server systems 542, 567 may also run any of a variety of additional server applications and/or mid-tier applications, including the examples disclosed above, for example, with respect to server 112.

In some embodiments, the server systems 542, 567 may include one or more applications to pull, receive, analyze, aggregate, and/or consolidate data feeds and/or event updates received from various data sources. As an example, data feeds and/or event updates may include, but are not limited to, application 506, 508, 512, and/or 512-1 updates and/or data feeds, interfaces/devices 505, 507, 511, and/or 511-1 updates and/or data feeds corresponding to the depicted feedback communications 502, which may include real-time events and/or data feeds related to sensor systems and/or components thereof, updates (real-time and/or otherwise) received from one or more third party information sources and/or continuous data streams, and/or the like. The server system 542 may also include one or more applications to display the data feeds and/or real-time events via the interfaces/devices 505, 507 and/or devices internal to the interaction infrastructure 402.

The application services system 541 and/or the data management system 566 may also include one or more resource data stores 568. The resource data stores 568 may include various forms of data storage including solid state storage, disk storage, databases (including relational, column, document, key-value and graph type databases) and cache. The resource data stores 568 may reside in a variety of locations, such as on a non-transitory storage medium local to (and/or resident in) the server systems 542, 567 and/or remote from the server systems 542, 567 and in communication with the server systems 542, 567 via a network-based or dedicated connection. In certain embodiments, the resource data stores 568 may reside in a storage-area network (SAN). Similarly, any necessary files for performing the functions attributed to the server systems 542, 567 may be stored locally on the server systems 542, 567 and/or remotely, as appropriate. In one set of embodiments, the resource data stores 568 may include relational databases that are adapted to store, update, and retrieve data in response to SQL-formatted commands. It should be appreciated that information corresponding to the repositories may be stored elsewhere and/or in other ways, or may not be stored, depending on the implementations chosen. Likewise, while various segregations of data corresponding to the repositories are provided herein, it should be appreciated that such examples are non-limiting, and some or all the data may be handled in any suitable manner.

In certain embodiments, the interaction infrastructure 402 may be implemented in or with a distributed computing and/or cloud computing environment with a plurality of servers and cloud-implemented processing, memory, and data resources. Thus, with accretion of service information, the system may allow for scaling out with additional processing resources, server resources, data storage resources, data management resources, and the like. Some embodiments may use different types of servers to service different types of interface devices 505, 507, 511, 511-1. The interaction infrastructure 402 may provision services facilitated by one or more components of the interaction infrastructure 402, and, in some embodiments, one or more of the services may be offered as cloud services. A specific instantiation of a service provided by the interaction infrastructure 402 may be referred to herein as a service instance. In some examples, a service provided by the interaction infrastructure 402 may include control communications 501, which may correspond to any one or combination of communications disclosed herein such as communications to effect resource assignment, resource assignment such as assignment nullification, modification, reassignment, etc.

In the illustrated embodiment, one or more interface devices 505, 507, 511, 511-1 may be used by users to interact with the interaction infrastructure 402. Although only a limited number of the interface devices 505, 507, 511, 511-1 is shown, any number of interface devices 505, 507, 511, 511-1 may be supported. In various embodiments, the interface devices 505, 507, 511, and/or 511-1 may correspond to client interfaces 405, resource acquisition interface 407, and/or event monitors 411. In various embodiments, the interface devices 505, 507, 511, and/or 511-1 may corresponding to devices supporting, communicating to/with and/or accessing client interfaces 405, resource acquisition interface 407, and/or event monitors 411.

In various embodiments, the interface devices 505, 507, 511, and/or 511-1 may be configured to operate a client application such as a web browser, a proprietary client application, a web-based application, an entity portal, a mobile application, a widget, or some other application, which may be used by a user of the interface devices 505, 507, 511, and/or 511-1 to interact with the interaction infrastructure 402 to use services provided by the interaction infrastructure 402. The interface devices 505, 507, 511, and/or 511-1 may be portable handheld devices of one or more of the types of client computing devices 102, 104, 106, and/or 108 disclosed above. In various embodiments, the interface devices 505, 507, 511, and/or 511-1 may include site component controllers and/or site components corresponding to monitoring systems and/or components thereof.

Figure 6:
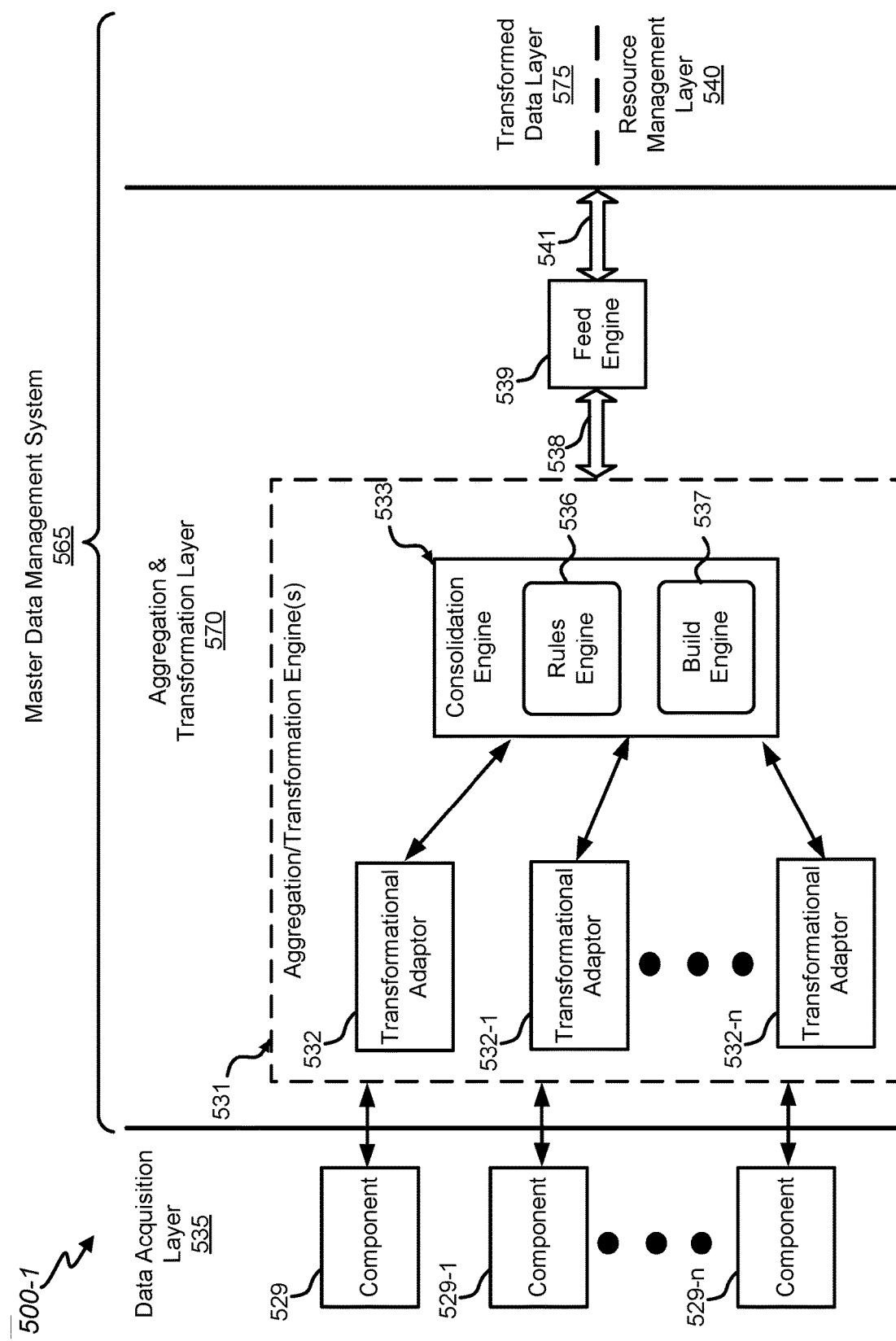
FIG. 6 shows a diagram of another portion of the architecture stack of the interaction infrastructure, in accordance with certain embodiments of the present disclosure.

FIG. 6 shows a diagram of another portion 500-1 of the architecture stack of the interaction infrastructure 402, in accordance with certain embodiments of the present disclosure. In particular, the portion 500-3 at least in partially includes the data acquisition layer 535, the aggregation and transformation layer 570, and the transformed data layer 575. The data acquisition layer 535 may receive data from components 529. In various embodiments, the components 529 may correspond to any one or combination of data sources disclosed herein and/or the like, with aggregation being facilitated in some embodiments with any one or combination of interfaces 405, 407, 411, and/or interface devices 505, 507.

As disclosed herein, the data sources may be sources of resource description data, such as resource states, resource attributes, resource forecasts, and/or the like. Furthermore, in various embodiments, the one or more data sources may include one or more of a database, a website, any repository of data in any suitable form, a third party system, monitoring systems local to a site that detect data indicative of events (e.g., temperature, wind speed, and/or other sensor systems) and/or components thereof. By way of example, the one or more data sources may be sources of event data indicative of environmental and/or civil events such as current, real-time, forecast, and/or historical information for one or more regions including and/or proximate to one or more sites relating to: weather conditions (e.g., typhoon, hurricane, etc.) from a weather service using real-time weather analytics and/or the like; flood conditions; earthquakes (e.g., notifications from the USGS and/or the like); news (e.g., about geo-political unrest, a site and/or an entity associated therewith); product/process change notices and/or end-of-life notices affecting resources; and/or the like.

In some embodiments, the components 529 may include complimentary layers to facilitate data transmission, such as a transmission layer, generation layer, and/or a receiving layer to communicate and/or receive data via the data acquisition layer 535. In various embodiments, the input from the components 529 may correspond to any one or combination of raw data, unstructured data, structured data, information, and/or content which may include media content, text, documents, files, instructions, code, executable files, images, video, audio, and/or any other suitable content suitable for embodiments of the present disclosure. For example, data from 40, 400, or any number of different sources may be merged together with data generated internally, data previously received, data from third parties, etc.

The aggregation and transformation layer 570 may provide a pipeline that processes data input from the components 529, applies rules, transforms the data, feeds the transformed data to the transformed data layer 575 and/or the application services management layer 540. The aggregation and transformation layer 570 may include one or more aggregation and/or transformation engines 531. In various embodiments, the aggregation and/or transformation engine 531 may correspond to an integral engine or separate engines working in conjunction. The aggregation/transformation engine 531 may transform, translate, or otherwise adjust data collected. A pattern-based reasoner could be employed to use various statistical techniques in analyzing site component data in order to make inferences based on the analysis. A transitive reasoner could be employed to infer relationships from a set of relationships related to site component data. For example, patterns of provisioning of certain resources by certain providers may be determined. Such patterns may indicate variance with respect to timetables of certain providers providing certain resources. Such variance may indicate certain providers generally needs were generally do not provider-specified schedules provisioning certain types of components. As a result, scheduling buffers may be implemented to account for projected latency with respect to certain providers and certain components based at least in part on determined patterns for the providers and components.

In some embodiments, two or more of the components 529 may generate data according to different formats. The data can then be transformed, translated, or otherwise adjusted by the engine 531. For example, acquired data may be converted from a first format to a second format using one or more conversion rules, which may be user-defined, heuristic, and/or machine-learned. In some embodiments, the transformation engine 531 may perform similar operations with respect to other data generated by elements of the interaction infrastructure 402.

In some embodiments, the aggregation and/or transformation engines 531 may include one or more transformational adaptors 532. In some embodiments, one or more transformational adaptors 532 may be associated with the components 529 to effect the transformations. The transformational adaptors 532 may be implemented, in various embodiments, in hardware and/or software. In some embodiments, a transformational adaptor 532 may include a hardware device and/or software component that transforms, translates, converts, or otherwise adjusts the acquired data. In various embodiments, the adjustment operations may be executed within the data acquisition layer 535 and/or the transformation layer 570.

A consolidation engine 533 may process manifold data sets that may, for instance, come from different sources or the same source, for example, by way of one or more updates to data previously provided by a particular source, and the consolidation engine 533 may consolidate the data sets to form a composite data set. The consolidation may include organizing, categorizing, qualifying, and/or comparing the sets of information; detecting, identifying, and/or handling errors/discrepancies; and/or otherwise processing the data sets. Aggregated information may be consolidated to provide useful customer alerts based at least in part on the consolidated information, and to balance loads based on system-determined conclusions regarding all the facilities.

In various embodiments, a rules engine 536 may be configured to create and manage entity rules, condition-response rules, alert/reports rules, data-formatting rules, data-sharing rules, transmission rules, aggregation rules, user authorization rules, and other similar rules. Such rules may be user-defined, fixed, heuristics, learned by elements of the interaction infrastructure 402, and any combination of the foregoing. In some embodiments, the rules engine 536 may be included in the consolidation engine 533. In some embodiments, the rules engine 536 may be separate from the consolidation engine 533.

A build engine 537 may assess quality of the data and/or the data sources. The build engine 537 may build one best data set that relates to a particular entity. In some embodiments, the build engine 537 may build multiple high-quality data sets that relate to a particular entity, but are tailored for different purposes (e.g., different locations, intermediary channels, medial channels, and/or the like).

A feed engine 539 may be configured to process received input 538 from the aggregation/transformation engine 531. In some embodiments, the feed engine 539 may be integral with the aggregation/transformation engine 531. The feed engine 539 may generate one or more feeds 541 transferred to the transformed data layer 575 (e.g., for storage) and/or the site management layer 540 (e.g., for more immediate use, by the site components management engine(s) 524 or another service). In some embodiments, the feed engine 539 may generate a single feeder 541—a universal feed object—to feed the transformed data layer 575 and/or the site management layer 540. The feed engine 539 may feed transformed data (which may include transformed information and/or transformed content in some embodiments).

Figure 7:
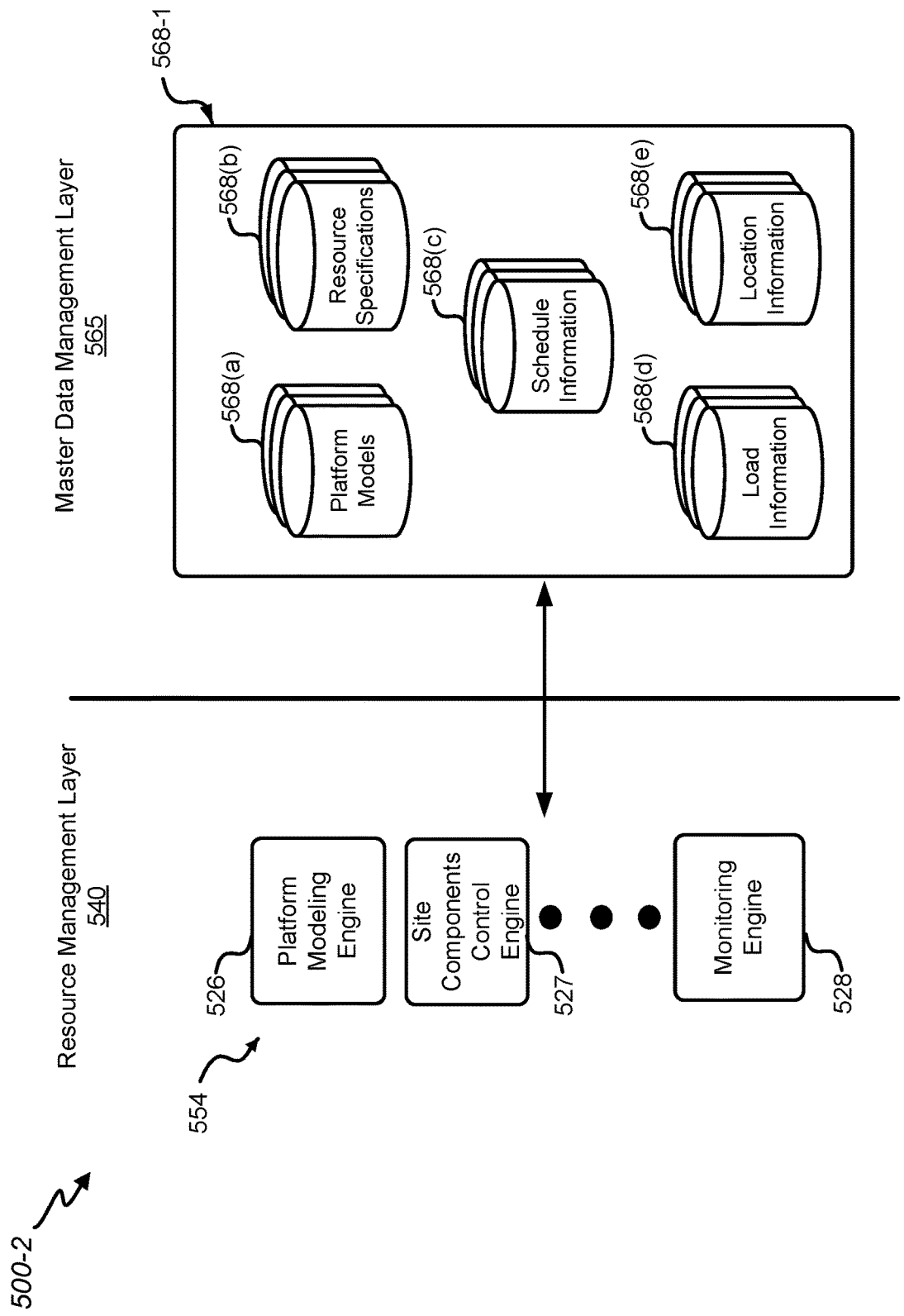
FIG. 7 shows a diagram of another portion of the architecture stack of the interaction infrastructure, in accordance with certain embodiments of the present disclosure.

FIG. 7 shows a diagram of another portion 500-2 of the architecture stack of the interaction infrastructure 402, in accordance with certain embodiments of the present disclosure. The portion 500-2 may, in some embodiments, correspond to portions of the resource management layer 540 and the master data management layer 565. The resource management layer 540 may include one or more site component management engines 524. The site components management engines 524 may include one or more platform modeling engines 526, one or more site components control engines 527, and/or one or more site monitoring engines 528, which may be separate or integrated in various embodiments. In some embodiments, the resource data stores 568 may include any one or combination of one or more platform models 568($a$), resource specifications 568($b$), schedule information 568($c$), load information 568($d$), location information 568($e$), and/or the like information suitable to facilitate embodiments of this disclosure. Certain embodiments of the platform models 568($a$) may include the resource specifications 568($b$), the schedule information 568($c$), the load information 568($d$), the location information 568($e$), and/or the like Consequent to processing resource and/or event data, the platform modeling engine 526 may utilize the information to determine particularized resource assessments for one or more platforms and/or sites based at least in part on evaluating the data against platform models 568($a$), the resource specifications 568($b$), the schedule information 568($c$), the load information 568($d$), and/or the location information 568($e$). The platform models 568($a$) may include bills of materials, quantities, and configurations for various platforms. The platform modeling engine 526 may take into account a multiplicity of variables and constraints to generate resource specifications 568($b$) that correspond to resources specified by the platform models 568($a$). By way of example, the resource specifications 568(b) may include any specifications for resources suitable for embodiments of this disclosure, such as resource identifiers that may include component numbers; component sources; resource identifiers matched to identifiers of component sources; functional, physical, and/or other descriptions of the component; assignments of components to platforms; information defining local availability assessment of components; and/or the like. In some embodiments, the platform modeling engine 526 may orchestrate the control of loads assigned to multiple sites for provisioning resources according to the particularized platform models 568(a) and schedule information 568(c). By way of example, the schedule information 568(c) may include any time information for resources suitable for embodiments of this disclosure, such as schedules, time targets, timetables, and milestones for particular platforms and particular components; corresponding quantities of particular platforms, components, and/or sources; corresponding stages such as generation, production, packing, availability assessment, storage, assembly, and shipping; locations and lead times for corresponding demand and/or orders specific to particular platforms, components, and/or sources; corresponding to the various stages for particular platforms and/or components; and/or the like. By way of example, the load information 568(c) may include any load information suitable for embodiments of this disclosure, such as specifications of resource providers; historical, current, and projected component availability assessments of particular resource providers; alternative resource providers available for certain components along with capacities for the resource provisioning; diversity information indicating diversity of resource providers assigned particular components according to particular schedule information; and/or the like. By way of example, the location information 568(e) may include any location information suitable for embodiments of this disclosure, such as geolocation data and coordinates for particular resource providers and/or components of various stages; historical, current, and/or forecasted weather, earthquake, flood, geopolitical, and/or other event information associated with locations of resource providers; and/or the like.

The platform modeling engine 526 may generate optimized load-balancing schemes based at least in part on the evaluating the data against platform models 568(a), the resource specifications 568(b), the schedule information 568(c), the load information 568(d), and/or the location information 568(e). Such load-balancing schemes may take into account different resource providers, platforms, resource specifications for the platforms, locations of different resource providers, events corresponding to the different resource providers and/or locations of the different resource providers, and/or optimized management of loads.

In some embodiments, the monitoring engine 528 may facilitate one or more learning modes. For example, the monitoring engine 528 may gather and process site component data to create a site profile. In some embodiments, the monitoring engine 528 may determine site component data based at least in part on manager input, sensor data, and/or the like.

The platform modeling engine 526 and/or the site components control engine 527 may send one or more services, which may include control communications, to cause adjustments of resource assignments per the load-balancing schemes to dynamically balance site loads. Resource provisioning assignments, states, schedules, and/or other characteristics of the sites and/or site components may be tracked by the site monitoring engine 528. The particularized load-balancing schemes may be adjusted, periodically or in real-time, based on updated information gathered by the site monitoring engine 528—updated platform models 568(a), resource specifications 568(b), schedule information 568(c), load information 568(d), location information 568(e), and/or the like. The site monitoring engine 528 may monitor variables, and the site components management engine 524 may utilize feedback loops and learning algorithms to dynamically analyze persistence information over time and generate finessed corrections. The platform modeling engine 526 may learn differences from projections over time (e.g., taking into account seasonal or other periodic differences) and may calibrate over time. User-selectable options provided via user notifications could be provided to allow a user to confirm or correct determinations made by the platform modeling engine 526. The feedback could be used for training the system to heuristically adapt conclusions, profiles, correlations, attributes, triggers, patterns, and/or the like.

Figure 8:
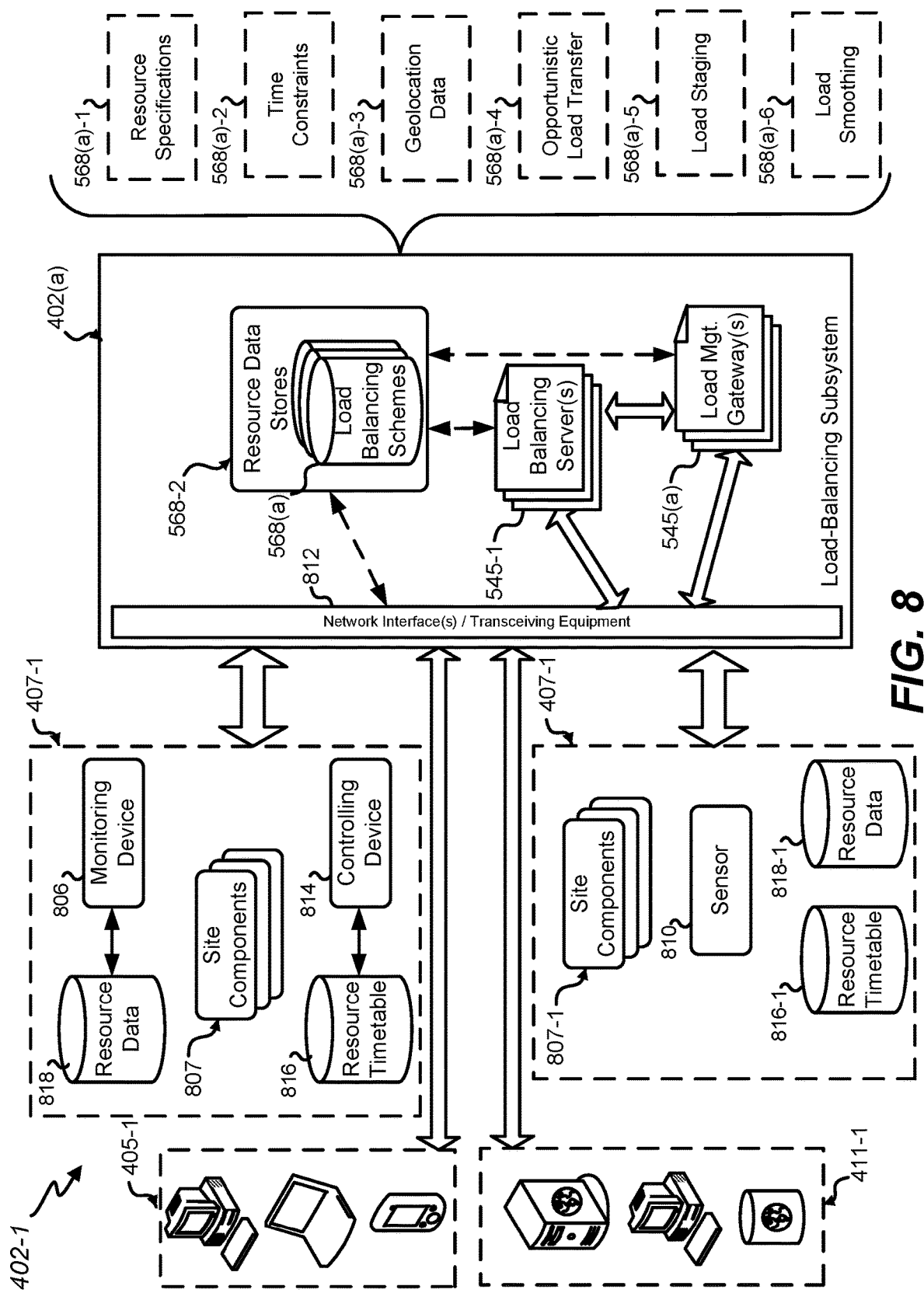
FIG. 8 shows a diagram of a load-balancing subsystem of the interaction infrastructure, in accordance with certain embodiments of the present disclosure.

FIG. 8 shows a diagram of a load-balancing subsystem 402(a) of the interaction infrastructure 402-1, in accordance with certain embodiments of the present disclosure. The interaction infrastructure 402 may include resource balancing controls hardware and software that holistically manage resources from a multiplicity of sites and locations corresponding to particular resource providers, platforms, and platform components. The depicted instance shows resource data acquisition interfaces 407-1, 407-2 corresponding to two facilities. In certain instances, each of the facilities corresponds to or includes one or more sites. Each facility may correspond to a particular location (e.g., as defined by geographic coordinates, cities, towns, states, provinces, districts, counties, zip codes, territories, countries, etc.). The infrastructure 402 may pull or otherwise receive such location particulars for each facility for transformation and storage in the data stores 568 for use in making resource assessments, generating resource alerts and reports, querying resource data, making resource assignment adjustments, and/or the like. Each facility may be geographically separated from each other, and may be associated with different or the same entities.

Each facility may generate, maintain, supply, and/or otherwise provide resources, which may include site components 807, 807-1 that correspond to platform components. In various instances, each of at least some site components 807, 807-1 within a facility may be of a same or similar type, may be configured for a same or similar type of use, and/or may have one or more same and/or similar specifications and/or characteristics (e.g., functions, features, dimensions, sizes, intra-unit components, etc.). In various instances, site components 807, 807-1 within a facility may be of different types, may be configured for different types of use, and/or may have one or more different specifications and/or characteristics. The infrastructure 402 may pull or otherwise receive such site component particulars for each facility for transformation and storage in the data stores 568 for use in making resource assessments, generating resource alerts and reports, querying resource data, making resource assignment adjustments, and/or the like.

In certain instances, a facility may include one or more sensors 810. In various instances, a given sensor 810 may, or may not, be fixed in place (i.e., stationary), restrained to limit mobility, or fully movable. A sensor 810 may include, for example, a sensor configured to monitor production and/or availability of site components 807-1. In certain instances, a sensor 810 may be coupled to production machinery and/or availability assessment machinery of the facility. For example, a sensor 810 may be configured to detect when site components 807-1 are produced and ready for storage and/or shipment. A sensor 810 may be included within a badge reader component so as to detect badge-related signals (e.g., an image or RFID signal), may be included within an equipment-tracking component so as to detect equipment tags, may include a receiver to receive signals from one or more signal sources (e.g., GPS satellites or WiFi access points) to enable identifying a location of a device coupled to or including the sensor.

A sensor 810 may be configured to transmit electronic communications to one or more other electronic devices. The infrastructure 402 may pull or otherwise receive such sensor-based communications including data for each facility for transformation and storage in the data stores 568 for use in making resource assessments, generating resource alerts and reports, querying resource data, making resource assignment adjustments, and/or the like. The electronic communications may be transmitted, for example, upon detecting a new type of signal (e.g., detecting a presence of a new device); at regular times or intervals; upon receiving a request; and/or upon detecting that a transmission condition has been satisfied. The electronic communication may be transmitted to a device that is near or remote from the sensor. The electronic communication may include (for example) sensor-collected data, inputs received at a component, an indication that an event has been detected, an indication that a transmission condition has been satisfied, an identifier of the sensor, and/or a location of the sensor. The electronic communication may be transmitted, for example, over a wireless network, WiFi network, short-range network, Bluetooth network, local area network, and so on.

In certain instances, a facility may include a monitoring device 806, which may be a computer system and/or server system including or coupled to a monitoring device 806 in various instances, to track resource states and/or attributes. The resource states and/or attributes may include, for example, resource identifiers, resource specifications, resource functions, resource generation, production, packing, availability assessment, storage, staging, shipping, and/or the like of one or more resources (e.g., a site component 807). In various instances, monitoring device 806 may or may not be located within a facility. In some instances, monitoring device 806 can be configured to receive input (e.g., from an authorized user), which may indicate resource states and/or attributes. In some instances, monitoring device 806 may be (e.g., via a wireless or wired connection) connected to machinery for resource generation, production, packing, availability assessment, storage, staging, shipping, and/or the like of one or more resources and/or one or more sensors 810. Such connections may enable monitoring device 806 to estimate a resource state.

Monitoring device 806 can manage and update resource data store 818. The infrastructure 402 may pull or otherwise receive resource data from the monitoring device 806 and/or the resource data store 818 for each facility for transformation and storage in the data stores 568 for use in making resource assessments, generating resource alerts and reports, querying resource data, making resource assignment adjustments, and/or the like. The resource data store 818 can include resource data for particular resources, facilities, entities (e.g., clients), and/or the like. The resource data may include resource description data, which may include resource identifiers, resource specifications, resource functions, and/or the like. The resource description data may further include historical, current, and/or projected resource states and/or attributes such as resource identifiers, resource specifications, resource functions, resource generation, production, packing, availability assessment, storage, staging, shipping, and/or the like of one or more resources. The resource data store 818 may or may not be part of monitoring device/system 806. In some instances, the resource data store 818 is remote from monitoring device/system 806, and/or one or more facilities to which it pertains. In some instances, the resource data store 818 is in the cloud. In some instances, the resource data store 818 and/or the monitoring device 806 may be included in the interaction processing infrastructure 402.

The facility can include one or more controlling devices 814. Each controlling device 814 can manage and update a resource timetable for one or more resources (e.g., site components 807). The infrastructure 402 may pull or otherwise receive timetable information from the one or more controlling devices 814 and/or a resource timetable data store 816 for each facility for transformation and storage in the data stores 568 for use in making resource assessments, generating resource alerts and reports, querying resource data, making resource assignment adjustments, and/or the like. The timetable may include a schedule that indicates that particular times and/or time periods that have been assigned to particular resources for particular entities for historical, current, and/or projected resource states and/or attributes such as resource identifiers, resource specifications, resource functions, resource generation, production, packing, availability assessment, storage, staging, shipping, and/or the like of one or more resources. Assigned times/periods may include or may be associated with one or more buffer time periods, such as a buffer time period to prepare and/or provide certain resources. The controlling device 814 may be configured to locally detect user input or to receive communications that identify user input, where the user input may identify a parameter for the resource timetable and/or a request.

Generating the assignment may include updating the resource timetable data store 816 (e.g., which may be included within and/or remote from controlling device 814) so as to reflect the assignment and/or change timetable information. Generating the assignment may also include or may trigger transmitting a communication to another device (e.g., load balancing system 402(*a*)). The communication may identify one or more parameters of the assignment. As another example, a request may include a request to identify current and/or projected resource availabilities that correspond to identified times (e.g., an identified date range). As yet another example, a request may include a request to identify time periods available for one or more particular resources and for a particular entity. As still another example, the monitoring device 806 may receive a communication that identifies one or more parameters for a proposed assignment. The monitoring device 806 may present information corresponding to the proposed assignment via a user interface and may detect input indicating whether it has been accepted. If so, the assignment may be generated. If not, a response communication may be transmitted indicating this lack of acceptance, which may also include one or more other provisioning times proposed for assignment. In some instances, a single resource device may act both as a monitoring device 806 and a controlling device 814.

The load-balancing subsystem 402(*a*) may communicate with one or more monitoring devices/systems 806, controlling devices/systems 814, sensors 810, data stores 816, 818, client devices 405, and/or the like. The load-balancing subsystem 402(*a*) may actively gather, pull, and/or receive pushed updates including resource description data from one or more monitoring devices/systems 806, controlling devices/systems 814, sensors 810, and/or data stores 816, 818. The received resource data may be transformed and the transformed data and/or other data generated as disclosed herein.

The load balancing subsystem 402(*a*) may provide for load balancing control via one or more onsite load management gateways 542(*a*) and control software. One or more load balancing servers 542-1, which may include, utilize, or otherwise be communicatively coupled to and operate in conjunction with the load management gateways 545(*a*), may integrate, connect, and/or otherwise communicate to/with facility systems and devices, e.g., via network interfaces and/or transceiving equipment 812 and one or more networks (not shown). A load balancing server of the one or more load balancing servers 545-1 may determine and/or execute enterprise load control algorithms to implement optimal load control strategies. The load management gateways 542(*a*) may include a gateway to incorporate the load balancing algorithms and interface with event/forecast data, which, in various embodiments, may be gathered from a remote forecast server or developed by a server of the interaction infrastructure 402 based at least in part on the geographic location of a facility of interest.

The load-balancing subsystem 402(*a*) may receive communications from a plurality of controlling devices controlling individual resources and resource data and may update aggregated data structures disclosed herein to reflect current and forecasted resource descriptions, including assignments, availabilities, and/or the like. The load-balancing subsystem 402(*a*) may efficiently query multiple data sources, including local consolidated data stores, to make the resource assessments disclosed herein. As part of the resource assessments, the load-balancing subsystem 402(*a*) may determine resource adjustments (e.g., reassignment of resources to the different resource providers according to particular quantities and timetables, additional assignments of resources to resource providers according to particular quantities and timetables, etc.) based at least in part on one or more load-balancing schemes 568(*a*). The load balancing subsystem 402(*a*) may take into account resource specifications 568(*a*)-1, time constraints 568(*a*)-2, and/or geolocation data 568(*a*)-3, to identify one or more load-balancing schemes 568(*a*) is a best fit for a particular set of resource information, including particular platforms, particular platform components, the platform models, particular resource providers, particular criticality assessments of the same, rankings and categorizations/scores of the same with respect to simulations disclosed herein, and/or the like. In various embodiments, the one or more load-balancing schemes 568(*a*) may specify, for example, criteria and conditions for plans to implement opportunistic load transfer 568(*a*)-4, load staging 568(*a*)-5, load smoothing 568(*a*)-6, and/or the like. Accordingly, some embodiments may include selecting an operations strategy from a set of two or more load-balancing schemes 568(*a*).

By way of example, the load-balancing schemes 568(*a*) may include an opportunistic load-transfer scheme 568(*a*)-4, a load-staging scheme 568(*a*)-5, a load-smoothing scheme 568(*a*)-6, and/or the like. One or more of the load-balancing schemes 568(*a*) may identify and take advantage of resource capacities of resource providers. Specifically, a load-balancing scheme 568(*a*) may identify resource providers with capacities to provision particular resources according to particular time tables. One or more high-risk and/or moderate-risk resource providers and one or more alternative resource providers with capacities to meet identify target quantities in time tables for particular platform components may be identified. The opportunistic load-transfer scheme 568(*a*)-4 may be directed to specifying a reassignment of load for the platform components from the one or more high risk and/or moderate risk resource providers to the one or more alternative resource providers when the opportunities are identified. The load-staging scheme 568(*a*)-5 may be directed to identifying particular loads that benefit from modifying quantity buffers, timetable buffers, and/or resource assignments to resource providers for particular platform components. The load-smoothing scheme 568(*a*)-6 may be directed to identifying load imbalances with respect to a set of one or more particular resource providers assigned to provision particular components. Identification of load-balancing specifications may be triggered by one or more resource assessments identifying provisioning patterns, criticalities of platforms and components, risk attributes, and/or the like disclosed herein. In some embodiments, one or more thresholds for assessments of risk attributed to the one or more resource providers may be employed to trigger identification of a load transfer/assignment situation. The one or more thresholds may correspond to scoring and or categorizing resource providers as disclosed further herein. In some embodiments, determination of a load transfer/ assignment situation by the infrastructure 402 may trigger alert generation and transmission, recommendation of a particular load transfer/assignment for particular components, providers, timetables, and quantities, and, in some cases, automatic initiation of the load transfer/assignment without user initiation (e.g., in cases of certain high-risk thresholds being satisfied and/or a lack of use her response to want more notifications for a certain time period) with post hoc notifications being generated and transmitted to one or more users.

Figure 9:
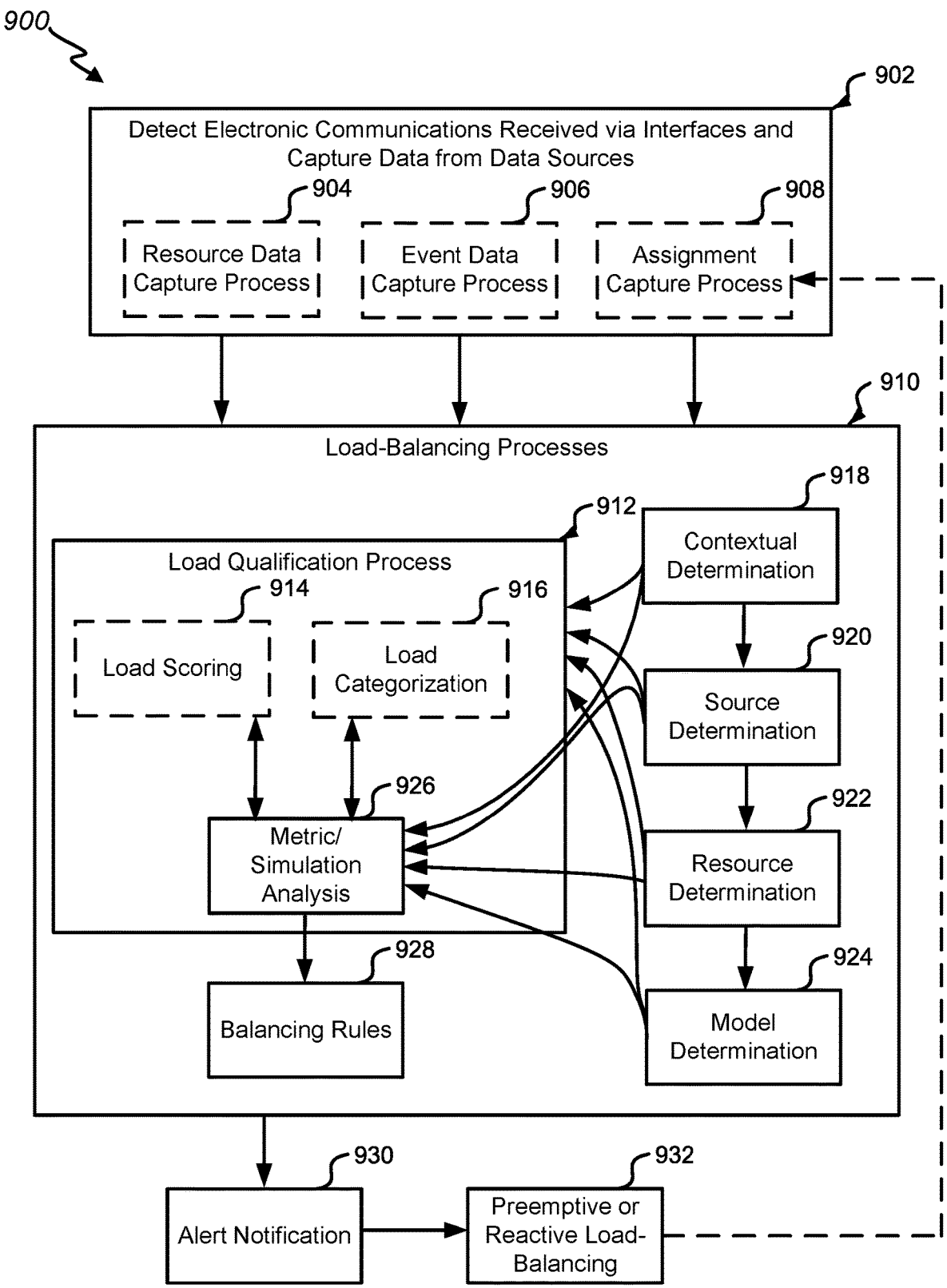
FIG. 9 depicts certain aspects of a method for facilitating resource balancing and notifications of resource assessments based at least in part on resource capacities, assignments of tasks to resources, and/or event recognition, in accordance with certain embodiments of the present disclosure.

FIG. 9 depicts certain aspects of a method 900 for facilitating resource balancing and notifications of resource assessments based at least in part on resource capacities, assignments of tasks to resources, and/or event recognition, in accordance with certain embodiments of the present disclosure. Various embodiments may employ any one or combination of various methods of facilitating resource balancing and notifications of resource assessments disclosed herein. In various embodiments, the method 900 may be performed in whole or in part by the interaction infrastructure 402. It is noted that the method 900 may include additional steps corresponding to various features disclosed herein, and that any of the steps presented herein may be rearranged, optional, and/or modified to include other steps and/or features described in this disclosure.

As indicated by block 902, the infrastructure 402 may detect one or more electronic communications received via the one or more interfaces 405, 407, and/or 411 and may capture one or more sets of data may be captured from one or more data sources. As disclosed herein, different types of data may be captured from a variety of different data sources. For example, the data capture may correspond to resource data capture 904, including resource descriptions, resource states, resource attributes, and/or the like, from resource providers as disclosed herein. In some embodiments, the data capture may additionally correspond to event data capture 906, including event data indicative of environmental events, civil events, and/or the like as disclosed herein. In some embodiments, the data capture may additionally correspond to assignment data capture 908, which may correspond to communications/user input to effect resource assignment, resource assignment such as assignment nullification, modification, reassignment, etc. with respect to platforms, platform components, types and quantities thereof, corresponding schedules, corresponding resource providers, and/or the like.

As indicated by block 910, one or more load-balancing processes may be based at least in part on the one or more sets of data may be captured from one or more data sources. The load-balancing processes 910 may include one or more load qualification processes 912. The load-balancing processes may include processes for contextual determination 918, source determination 920, resource determination 922, and/or model determination 924. In some embodiments, any one or combination of such determinations may be utilized in the load qualification process 912 to identify, characterize, score, categorize, and/or qualify loads actually assigned and/or potentially assigned to resource providers.

As indicated by block 912, having captured data, the infrastructure 402 may implement a one or more load qualification processes. The one or more load qualification processes 912 may include one or more metric analysis processes 926 to make resource assessments. In some embodiments, the infrastructure 402 may make resource assessments triggered by event data. In some embodiments, the infrastructure 402 may make resource assessments without such assessments being triggered by event data. The infrastructure 402 may, for example, periodically assess resource providers, resources, and platforms to determine if any are at risk of not being able to meet resource demand in terms of types of resources, time constraints, and resource quantities due to load imbalances, provisioning patterns of resource providers, and/or event patterns for locations of resource providers.

In some embodiments, the load qualification could entail a load categorization scheme 916. By way of example, the load categorization scheme 916 could include categories such as: extreme load imbalance, high risk, and/or high probability of highly disruptive event; significant load imbalance, moderate risk, and/or moderate probability of disruptive event; low load imbalance, low risk, and/or low probability of disruptive event; no significant loading balance, negligible risk, and/or minimal potential for disruptive event; and/or the like. The criteria for qualifying load may specify rules and thresholds for various types of load data. For example, criteria for qualifying loads may specify rules and thresholds based at least in part on any one or combination of: historical, current, and/or projected event data for resource providers and/or locations of resource providers; resource availability assessments local to the infrastructure 402 and at resource providers; diversity of resource providers assigned to provision particular resources; patterns of provisioning; criticality of platforms and/or components; revenue impact; and/or other factors disclosed herein. In some embodiments, load qualification could entail a load scoring system 914 where loads are scored according to any one or combination of the various factors disclosed herein. The load scoring system 914 could be correlated to the category scheme 916 in some embodiments, such that certain scores correspond to certain categories. Some embodiments may score loads with numerical expression.

By way of example, a load scoring scale could include a range of load scores from 0 to 100, or from 0 to 1,000, with the high end of the scale indicating greater load imbalance, risk, and/or probability of a highly disruptive event. However, other embodiments may employ a reverse scale where the lower scores indicate greater risk etc. Some embodiments may use methods of statistical analysis to derive a load score. Various embodiments may determine a load score based on any one or more suitable quantifiers. In some embodiments, an identification score may be cumulative of individual scores based on matching each type of the characteristics. With load score determined, categorizations may be made based on the score. By way of example, a score correlated to a 75-100% band may correspond to an extreme load imbalance, a high risk, and/or a high probability of highly disruptive event; a score correlated to a 50-75% band may correspond to a significant load imbalance, a moderate risk, and/or a moderate probability of a disruptive event; a score correlated to a 25-50% band may correspond to a low load imbalance, a low risk, and/or a low probability of a disruptive event; and a score below a 25% minimum threshold may correspond to no significant loading balance, a negligible risk, and/or a minimal potential for disruptive event.

The contextual determination 918 may take into account a multiplicity of factors and data points. For example, the contextual determination 918 may be triggered by event data being received and processed, where the event data may correspond to a certain type of event. The contextual determination 918 may include determining a type of event based at least in part on the event data received and a severity of the event, with greater severity being correlated to a greater (or lesser) load score. The type of event may be determined based at least in part on the data source. For example, seismic data and/or earthquake alerts coming from the USGS may be identified based on the source. Furthermore, the event data itself may indicate the type of event by way of an identifier and/or the character of the data itself which can be recognized as part of the contextual determination 918. Likewise, weather data gathered from a weather service may be determined by the infrastructure 402 to correspond to certain types of weather events based at least in part on keyword recognition, alert recognition, and the like. In some embodiments, weather data gathered from a weather service and/or weather data sensors may be determined by the infrastructure 402 to correspond to certain types of weather events based at least in part on comparing the data to one or more thresholds. For example, the infrastructure 402 may compare wind speed data to one or more wind speed thresholds to determine high-wind events. In similar fashion, the infrastructure 402 may compare seismic data to one or more thresholds in order to identify seismic events of significance. Additionally, in some embodiments, the infrastructure 402 may utilize keyword recognition and message analysis to identify alert conditions with respect to geopolitical news information gathered. Likewise, in some embodiments, the infrastructure 402 may identify alert conditions with respect to gathered news information that is specific to a particular resource provider that is negative (e.g., going out of business) and/or otherwise potentially disruptive (e.g. the resource provider is to undergo a merger).

Certain embodiments may provide for keyword processing of event data, and resource assessments may be based at least in part on keyword identification of event data. In some embodiments, the monitoring engine 528 could process event data for keyword identification to recognize content/data that is evidence of an environmental event of significance and/or a geo-political event of significance (e.g., a status of civil unrest). Certain keywords may be indicia of such events. The monitoring engine 528 may identify keywords as distinctive markings and may compile the keywords for the purposes of characterizing an event. The keywords could be correlated with keyword criteria to characterize the event. The keyword criteria could include keywords identified by words, word stems, phrases, word groupings, and/or like keyword information, with weighting assigned thereto. A keyword could be assigned a weight according to its significance. Increased word weights could be tied to increasing probability of an event of significance. A greater number of corroborating news reports corresponding to location could be recognized and be tied to increasing probability of an event of significance. The keyword criteria could correspond to one or more keyword schemas that are correlated to various event scenarios. Recognized keywords of news reports, for example, could be matched with one or more keyword schemas and correlated to particular event scenarios. In some embodiments, a keyword schema could include word collections of strong indicators, weak indicators, and neutral indicators, that is, keyword information indicative of an event of significance. Within each collection, various words could be assigned various weights according to their significance. Such word collections could be implemented in any suitable manner, including word lists, word tables, matrices, and/or the like. And within a collection, keywords could be organized in a rank order and/or any auditable hierarchical structure according to weight. Some embodiments may have keywords organized according to decision tree, with contingencies so that only certain combinations of keywords may be considered. For example, certain keywords could only have significance if used in conjunction with other keywords, and/or not in conjunction with others. Some contingencies could be implemented so that only a threshold cumulative weight and/or keywords need be identified to characterize an event. For example, the top five keywords having the greatest weight of all the keywords within a bucket may cumulatively meet or exceed a minimum threshold of cumulative weight so that further processing of keywords need not be performed if hits for the top five keywords are found for a given news report. Certain embodiments may adapt over time to modify inclusions in word collections. Certain embodiments could apply a heuristic approach to adaptation. Certain embodiments may provide a user with user-selectable feedback options regarding alerts to allow a user to indicate whether the event recognition was correct, incorrect, or ambiguous.

Based at least in part on the characterization of the events, impacted locations may be identified and resource providers associated with the impacted locations may be identified with the source determination process 920. The impacted locations may be determined based at least in part on the event data. The impacted locations may be defined in terms of geographic coordinates, cities, towns, states, provinces, districts, counties, zip codes, territories, countries, distances from points of reference, direction with respect to points of reference and/or lines of reference (e.g., locations in or along a projected path of hurricane), etc. In some instances, proximity thresholds may be may be determined by the system pending on the nature of the event. For example, some events may be determined and localized (e.g., a fire affecting only facility the resource provider), while other events may potentially impact large areas (e.g., a typhoon). The proximity thresholds may be associated with different types of events in order to capture the appropriate resource providers located in actually impacted locations, as well as potentially impacted locations, with greater proximity being correlated to a greater (or lesser) load score.

The resource determination process 918 may determine resources (e.g., site components) assigned to the resource providers determined to be associated with the impacted locations. The model determination process 922 may determine platforms impacted by the event due to platform components assigned for provisioning from the resource providers determined to be associated with the impacted locations. In some embodiments, when the infrastructure 402 receives a notification trigger, it may create a report based at least in part on an system-determined event type, impacted locations, and/or impacted resource providers as part of the processes 918, 920, 922, and/or 924. The determination processes 918, 920, 922, and/or 924 may include determining affected internally assigned and externally assigned resource component numbers, other resource descriptions for the affected resources, affected platforms, affected resource providers, component sourcing statuses, corresponding availability assessment (e.g., weeks of availability assessment, quantity of components, etc.) for affected components at the resource provider and/or local to the infrastructure 402, alternative resource providers with current/projected availability for the assigned resources, delay estimated for the assigned resource provider to provide the assigned resources and/or delay estimated for provisioning of reassigned resources by alternative resource providers, affected component lead time, affected component demand within lead time, revenue impact due to the delay, and/or the like. Any one or combination of the factors and determinations may be correlated to a greater (or lesser) load score.

In some embodiments, the determination processes 918, 920, 922, and/or 924 may include determining whether conditions specified by the platform models are satisfied or exceeded. For example, a particular platform model may specify one or more availability assessment thresholds for particular platform components, and, if current and/or projected availability assessment quantities and/or timetables failed to satisfy, or exceed in some cases, the one or more availability assessment thresholds on a platform component basis and/or on a resource provider basis (e.g., if weeks-of-availability assessment is less than predetermined number of weeks), the infrastructure 402 may generate alert notifications regarding the resource assessment. As another example of conditions which may trigger alert generation, the determination processes 918, 920, 922, and/or 924 may include determining whether product/process change notices and/or end-of-life notices affecting one or more platforms on a platform component basis and/or on a resource provider basis.

Some embodiments may implement a Monte Carlo simulation of resource component demand. This model may utilize aggregated and consolidated resource data to calculate the higher and lower simulated demand for resource components, based at least partially on historical fluctuations in the platform demand (which may correspond to servers demand, in some embodiments). Knowing the quantity relationship of the resource component to the top-level resource composites for the platforms (which may correspond to servers, in some embodiments), the system may simulate the total effect of the fluctuations for individual resource components. This may facilitate system determination of a specifications and recommendations for resource buffers for potential, but predicted fluctuations in demand and therefore mitigate risk.

Additionally or alternatively, some embodiments may implement linear algebraic calculation of platform demand (which may correspond to servers demand, in some embodiments). This model may utilize aggregated and consolidated resource data regarding resource components and corresponding demand. This demand may be calculated from the composite demand of all the top-level resource composites for the platforms (which may correspond to servers, in some embodiments). Using the resource component demand and the resource component quantity per top-level resource composite, the system may create a matrix equation and/or vector equation of the quantity per top-level resource composite and platform demand which should equal the resource component demand. Using the determined resource component demand, Karamer's Rule, Gaussian-Jordan Elimination, and/or other matrix solving mathematical techniques may be employed by the system to solve for the platform demand. The system may then check this demand versus known demand to check for accuracy in the resource component demand.

As disclosed above, in some embodiments, the infrastructure 402 may make resource assessments without such assessments being triggered by event data, but may make resource assessments periodically, in real time, and/or when updated information is gathered by the site monitoring engine 528. In some embodiments, the metric and/or simulation analysis 926 may perform component commonality analyses. The analysis 926 may, for example, identify platform components that would impact one or more platforms the most. For example, situations where the platform components are sourced from a single resource provider or a set of resource providers with facilities limited to a single geographical location may be identified. Likewise, situations where the platform components are assigned to one or more critical platforms and/or where components are assigned to a greater number of platforms may be identified. The analysis 926 may include running simulations to forecast components shortage based on current availability assessment information, past provisioning and patterns of provisioning (e.g., plus or minus 7% or 8% on past meeting past provisioning quantity/time targets), and/or the like on component and/or resource provider bases. The analysis 926 may include running simulations to project shortages based at least in part on demand forecast changes. The analysis 926 may include running simulations to project shortages based at least in part on component lead time changes. Because some components are riskier than others, the simulations may generate optimized load buffers, which may, for example, correspond to availability assessment targets and scheduling buffers as disclosed above, to account for past provisioning variances, model timetables, and criticalities of platforms. Any one or combination of the simulation results may be correlated to a greater (or lesser) load score.

Further, the load qualification process 912 may utilize the metric and/or simulation analysis 926 to determine one or more load balancing rules 928 based at least in part on the load qualification results and results of the contextual determination 918, the source determination 920, the resource determination 922, and/or model determination 924. Based at least in part on the determined one or more load balancing rules 928 for handling one or more events, trigger conditions, resource assessments, categorizations, and/or the like, the infrastructure 402 may create one or more alert notifications 930. The one or more alert notifications 930 may be created to include any suitable content indicating any one or combination of the results of the determination processes 918, 920, 922, and/or 924. For example, such content may include text, image data, audio and/or video data indicative of affected internally assigned and externally assigned part numbers, other resource descriptions for the affected resources, affected platforms, affected resource providers, component sourcing statuses, corresponding availability assessment (e.g., weeks of availability assessment, quantity of components, etc.) for affected components at the resource provider and/or local to the infrastructure 402, alternative resource providers with current/projected availability for the assigned resources, delay estimated for the assigned resource provider to provide the assigned resources and/or delay estimated for provisioning of reassigned resources by alternative resource providers, affected component lead time, affected component demand within lead time, revenue impact due to the delay, and/or the like.

The one or more alert notifications 930 may include results of resource assessments that correspond to one or more recommendations of actions to be taken with regard to load balancing. In some cases, the one or more notifications 930 may include a recommendation for reactive load-balancing actions 932. For example, a reactive load balancing may be responsive to a particular events detected by the infrastructure 402 that are external to one or more resource providers (e.g., earthquakes, weather events, changes impacting a particular resource provider in other ways, etc.) but actually and/or potentially impact the one or more resource providers. In some cases, the one or more notifications 930 may include one or more recommendations for preemptive load-balancing actions 932 for example, preemptive load balancing may not be triggered by particular events external to the resource provider, but may correspond to a resource assessment of the load-balancing processes 910 that indicates a need for load balancing prior to any potential event that may negatively impact loads. For example, preemptive load balancing may correspond to recommended actions to implement load smoothing, load staging, opportunistic load transfer, and/or other reassignment of loads to different resource providers.

In various embodiments, the infrastructure 402 may be configured to transmit/push notifications to the interfaces 405 and client devices, which may be wireless devices, via one or more networks 110, 408, which may include one or more wireless channels. An application may be provided directly or indirectly by the infrastructure 402 for installation and execution by one or more devices corresponding to the interfaces 405 and may allow for invoking, waking up, opening, and/or otherwise activating the application responsive to the pushed notifications when the device is offline and/or otherwise not online with respect to the infrastructure 402, presentation of notifications, provisioning of a user interface to allow for output of information to a user and for input from user with one or more user-selectable options. In some embodiments, a third-party notification server system may be used to send such notifications to wireless device 216. An application may be provided directly or indirectly by service provider for installation and execution by the wireless device 216 to allow for invoking, waking up, opening, and/or otherwise activating the application responsive to notifications, presentation of notifications, provisioning of a user interface to allow for output of information to a user and for input from user with one or more user-selectable options.

In various embodiments, an end-user interface may include providing one or more display screens that may each include one or more user interface elements. An end-user interface may include any text, image, and/or device that can be displayed on a display screen for providing information to a user and/or for receiving user input. An end-user interface may include one or more icons, widgets, buttons, checkboxes, text, text boxes, text fields, tables, lists, and/or the like. With a notification with information about a condition governed by an automation rule, one or more user-selectable options (e.g., electronic buttons, HTTP link/hyperlinks, URLs, etc.) may be provided to prompt a user to login to the infrastructure 402 in order to access additional information and initiate recommended load-balancing actions.

As disclosed herein, the infrastructure 402 may include one or more network interfaces communicatively coupled to one or more servers, which may include communication servers, web servers, gateways, application servers, database servers, and/or one or more other types of servers. The network interfaces may include any suitable input/output module or other system/device operable to serve as an interface between one or more components of the interaction infrastructure 402 and one or more networks 110, 408. An interface layer of the infrastructure and may include one or more interface engines configured to generate one or more interfaces (e.g., web interfaces, mobile app interfaces, graphical user interfaces, enterprise application interfaces, resource data acquisition interfaces, programmatic interfaces, and/or the like) to enable data to flow to interface devices via respective applications.

In some embodiments, an access management layer of the infrastructure 402 may include one or more identity management engines. Generally, the identity management engine can be configured to provide identity services, such as access management and authorization services for end users and/or providers serviced by the interaction infrastructure 402. In some embodiments, the identity management engine may control information about end users and providers that utilize the services provided by the infrastructure 402. The control information may include information that authenticates the identities of end users and/or providers and that specifies authorized actions with respect to various system resources and services.

In some embodiments, the identity management engine may include logic for implementing account features in various embodiments. By way of example without limitation, the identity management engine may include logic one or more aspects of: handling user registration; managing account creation, updates, authentication, handling; and/or the like. The identity management engine may be configured for acquiring, processing, formatting, and/or storing authentication information in the one or more authentication information repositories. An authentication access engine may evaluate rules and conditions under which users may access elements of the infrastructure 402. A login engine may evaluate the rules and conditions under which users are able to log in to the interaction system or access applications associated with the interaction system. Thus, while authentication access engine may evaluate the rules to determine which users may access the infrastructure 402, the login engine may evaluate the particular credentials, profiles, etc. associated with each authenticated user.

Figure 10:
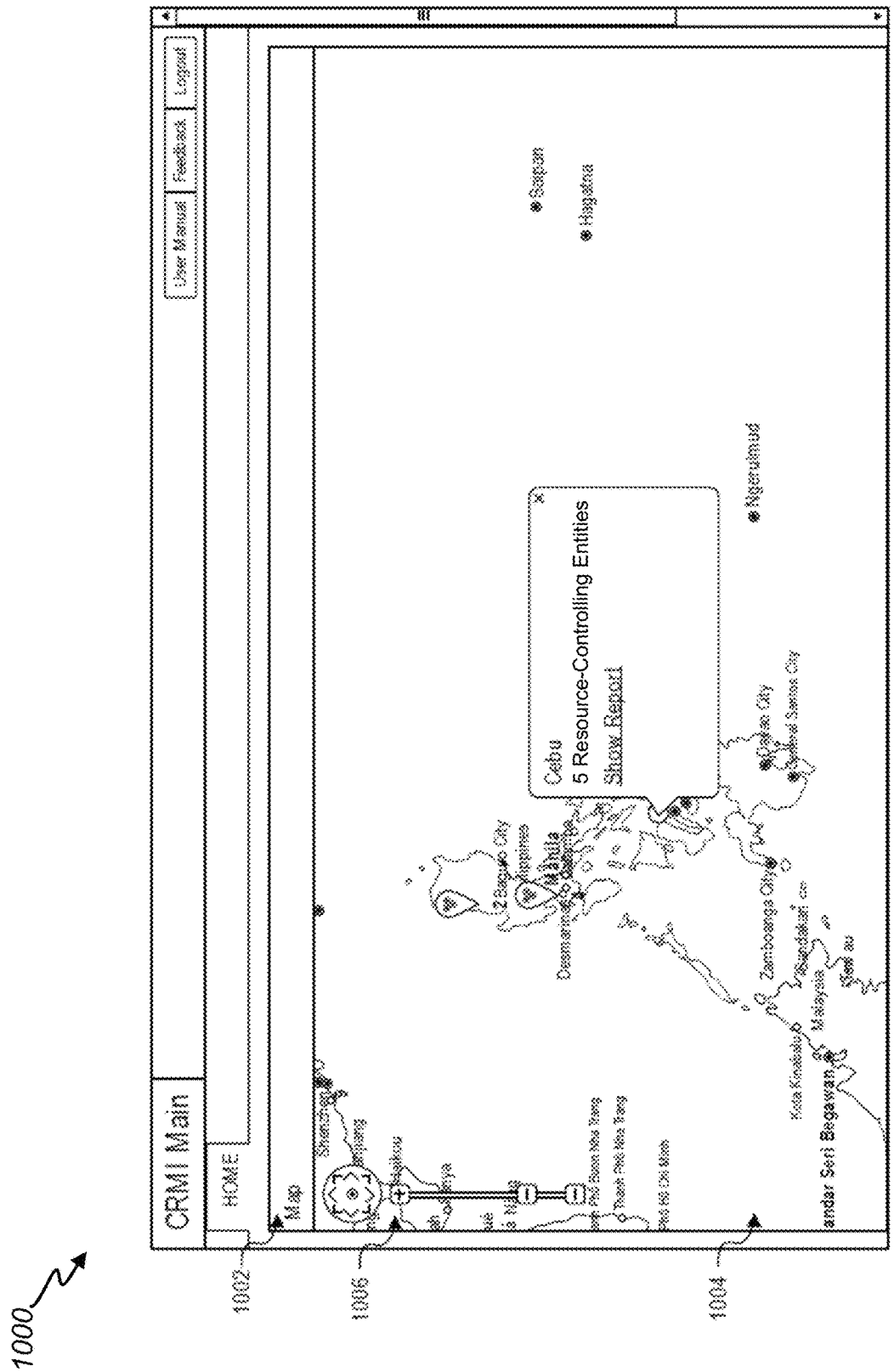
FIG. 10 is a screenshot illustrating example interface of the infrastructure, in accordance with certain embodiments of the present disclosure.

FIG. 10 is a screenshot illustrating example interface 1000 of the infrastructure 402, in accordance with certain embodiments of the present disclosure. In some embodiments, a user may be able access the interface 1000 consequent to selecting a user-selectable option facilitated with a notification pushed to a client device and logging in to the infrastructure 402. The interface 1000 may provide for a visual and interactive way in which to research, discover, and resource information based at least partially on geography. The interface 1000 may present a map interface component 1002. The map interface component 1002 may depict any desired geographical area 1004.

Figure 11:
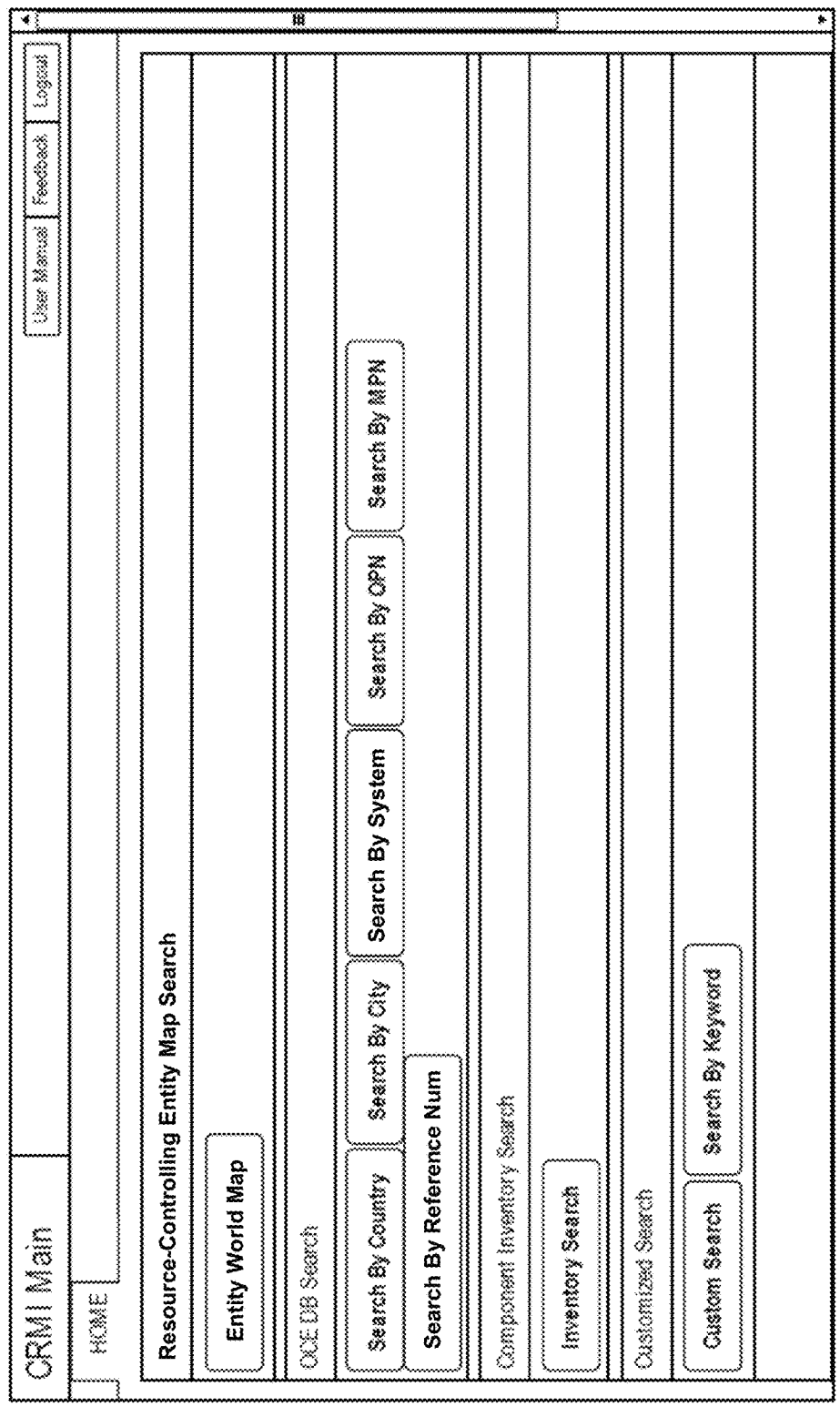
FIG. 11 is a screenshot illustrating example interface of the infrastructure, in accordance with certain embodiments of the present disclosure.

The interface 1000 may provide one or more user-selectable options 1006 for selecting a geographical area of interest, e.g., via input of a continent, country, city, state, zip code, and/or the like. A geographical area of interest may be graphically indicated in any suitable manner. In the example depicted, the current area indicates locations and quantities of providers that may correspond to particular platforms and/or particular platform components, the locations and numbers of which providers are graphically indicated on the map interface component 1002 with one or more user selectable options to drill down into finer details regarding the providers, show reports regarding the providers, performing queries regarding the providers, and/or otherwise access pertinent resource information. For example, FIG. 11 is a screenshot illustrating example interface 1100 of the infrastructure 402, in accordance with certain embodiments of the present disclosure, which provides access and abilities to search for resource information in a variety of ways. In the example depicted, a plurality of user-selectable options is provided to allow for access to resource information by a provider world map, country, city, provider, internal reference identification, external reference identification, location by reference identification, component availability assessment, customized searching, and keyword. Other embodiments are possible.

Figure 12:
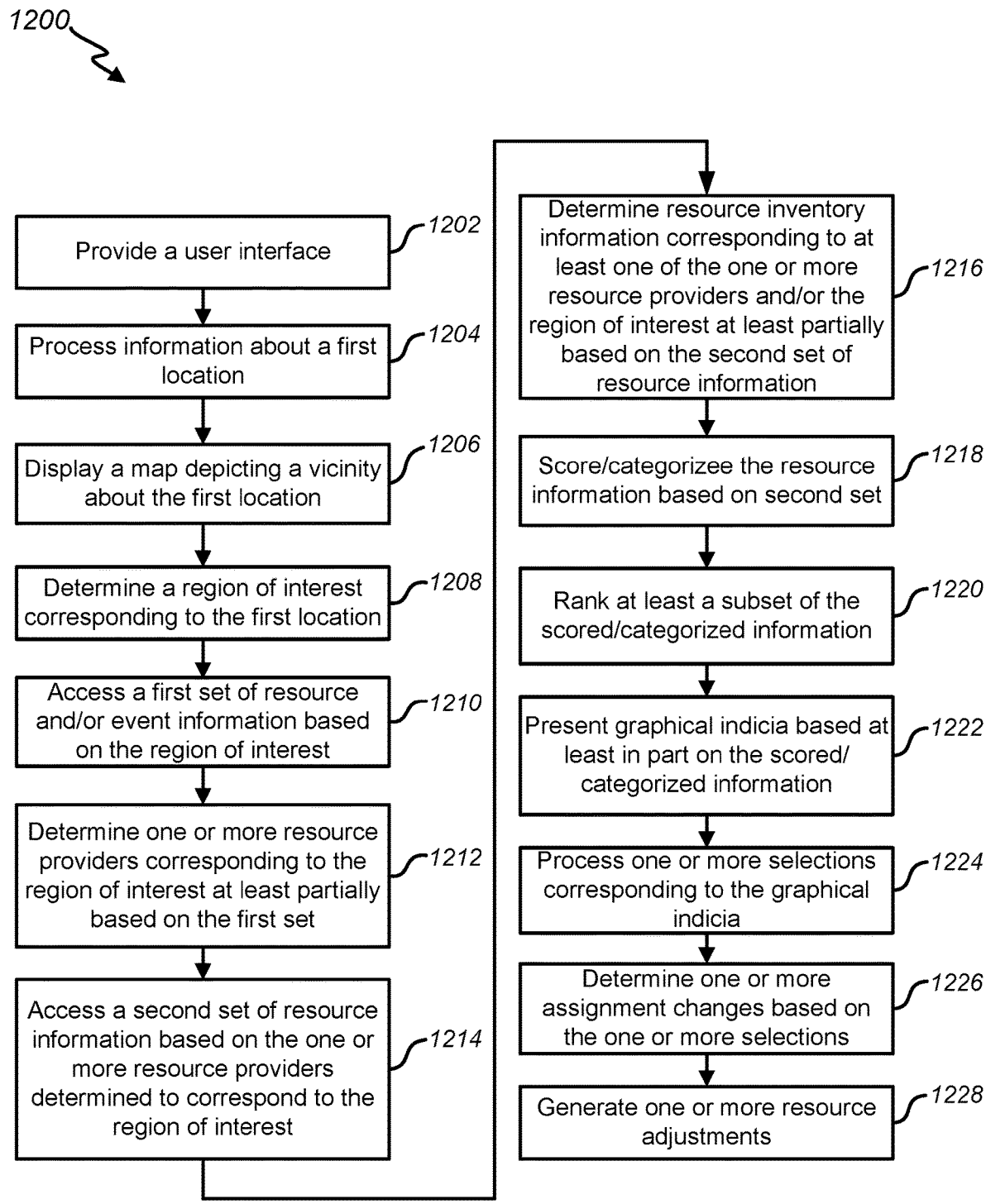
FIG. 12 illustrates an example method of resource information provisioning, in accordance with certain embodiments of the present disclosure.

FIG. 12 illustrates an example method 1200 of resource information provisioning, in accordance with certain embodiments of the present disclosure. Teachings of the present disclosure may be implemented in a variety of configurations that may correspond to one or more of the systems disclosed herein. As such, certain steps of the method 1200, and the other methods disclosed herein, may be omitted, and the order of the steps may be shuffled in any suitable manner and may depend on the implementation chosen. Moreover, while the following steps of the method 1200, and those of the other methods disclosed herein, may be separated for the sake of description, it should be understood that certain steps may be performed simultaneously or substantially simultaneously.

According to some embodiments, the method 1200 may begin as indicated by block 1202. As indicated by block 1202, a user interface may be provided according to one or more embodiments disclosed herein. As indicated by block 1204, information about a first location may be processed. As discussed herein, the infrastructure 402 may automatically identify a location of interest, and/or one or more user-selectable options for selecting a geographical area of interest may be provided, and corresponding user selection of search criteria may indicate a first location. By way of example without limitation, a user may identify any suitable location by indicate location information that may be in the form of an address, a partial address, a city, a zip code, latitude and/or longitude coordinates, a location keyword, any suitable location-indicating information, map manipulation, such as panning, zooming, a selection window, and/or the like.

As indicated by block 1206, in some embodiments, a map depicting a vicinity about the first location may be displayed. As discussed herein, additionally or alternatively, a non-map format may be presented to represent information corresponding to a vicinity about the first location and/or any other information that may be conveyed via a map display in accordance with various embodiments. For example, such information may be conveyed in a list format. As indicated by block 1208, in some embodiments, a region of interest corresponding to the first location may be determined. The region of interest may correspond to a vicinity about the first location. In some embodiments, a region of interest may correspond to predefined areas for various locations. In some embodiments, a region of interest may be based at least in part on a scope of the map that is displayed after the user has manipulated the map interface to display a particular area. The region of interest could be based at least in part on the extent of the area displayed with the map interface. Additionally or alternatively, the region of interest could be based at least in part on a portion of the area displayed with a map interface, such as, for example, a portion (e.g., a circular area or any other shape of area) encompassing a center point of the area displayed. In some embodiments, determining a region of interest corresponding to the first location may include determining coordinates, such as latitudinal and longitudinal coordinates corresponding to the first location. In some embodiments, the coordinates determined may define or otherwise indicate the region of interest.

As indicated by block 1210, in some embodiments, a first set of resource and/or event information may be accessed based at least in part on the region of interest. The first set of resource and/or event information may be gathered from one or more data stores. In some embodiments, the first set of resource and/or event information may include and/or be derived from resource and/or event data discussed herein. In some embodiments, at least some of the resource and/or event data may be pulled from a data source as needed, responsive to user input via the user interface. In some embodiments, such resource data may be pulled from a data source as a check for updates/additional data that may be used to update/supplement data in one or more data stores.

As indicated by block 1212, in some embodiments, one or more resource providers corresponding to the region of interest may be determined at least partially based on the first set of resource information. Accordingly, in some embodiments, one or more resource providers may be determined to be located within the coordinates of the region of interest. As indicated by block 1214, in some embodiments, a second set of resource information may be accessed. In some embodiments, the second set of resource information may be accessed based at least in part on user-entered query information and/or the one or more resource providers determined to correspond to the region of interest. Like the first set of information, the second set of resource information may be gathered from one or more data stores. And, like the first set of information, in some embodiments, the second set of resource information may include and/or be derived from resource and/or event data discussed herein. In some embodiments, the second set may be a subset of the first set.

As indicated by block 1216, in some embodiments, resource availability assessment information corresponding to at least one of the one or more resource providers and/or the region of interest may be determined at least partially based on the second set of resource information. Resource availability assessment information may correspond to the one or more resource providers relating to the region of interest and/or one or more triggering events. Resource availability assessment information may include or indicate available resources, resources in use or otherwise unavailable, availability assessment characteristics, such as a lack of availability assessment, available capacity, and/or the like, and/or any other suitable resource information disclose herein.

As indicated by block 1218, in some embodiments, the resource availability assessment and/or resource provider information may be scored and/or categorized according to categorization features disclosed herein. As indicated by block 1220, in some embodiments, at least a subset of the scored/categorized information may be ranked according to the scores and/or categories on a resource provider basis, a platform basis, and/or a platform component basis. As indicated by block 1222, in some embodiments, graphical indicia based at least in part on the scored/categorized information may be presented. In some embodiments, graphical indicia of one or more triggering events may also be presented (e.g., indications of earthquakes, weather events, etc. on a map interface).

As indicated by block 1224, one or more selections corresponding to the graphical indicia may be processed. In various embodiments, the graphical indicia could include one or more of text, symbols, images, icons, figures, dimension, color, and/or any other suitable means of graphical indicia that can be displayed on a display screen. As discussed herein, in various embodiments, information may be provided to a user by way of, without limitation, one or more widgets, text, text boxes, text fields, tables, grids, charts, maps, hyperlinks, buttons, lists, combo boxes, checkboxes, radio buttons, and/or the like.

As indicated by block 1226, one or more assignment changes may be determined based at least in part on the one or more selections. As indicated by block 1228, the one or more resource adjustments may be made by the infrastructure 402. Assignment information may be processed, retained in one or more data repositories, and transmitted to one or more resource providers and/or other interested parties (resource managers, for example). Such information may include any suitable resource information to facilitate assignment. Availability assessment and tracking information records may be updated to reflect the assignments.

In the foregoing description, for the purposes of illustration, processes were described in a particular order. It should be appreciated that in alternate embodiments, the processes may be performed in a different order than that described. It should also be appreciated that the processes described above may be performed by hardware components or may be embodied in sequences of machine-executable instructions, which may be used to cause a machine, such as a general-purpose or special-purpose processor or logic circuits programmed with the instructions to perform the processes. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Furthermore, in the foregoing description, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed:

1. A method comprising:
    detecting a first electronic communication received via one or more interfaces from a monitoring system;
    identifying an event indicated by event data of the first electronic communication, where the event is external to one or more resource-controlling systems and corresponds to a particular geolocation;

consequent to the first electronic communication, performing, by one or more load-balancing processors, load-balancing operations with respect to resources and a plurality of entities, the load-balancing operations comprising:
  selecting an event type of the event from a plurality of event types;
  identifying one or more entities based at least in part on the event, the event type, and the particular geolocation;
  identifying resource descriptions of resources assigned to the one or more entities, the resources comprising platform components specified by the resource descriptions with at least a resource identifier;
  identifying a model associated with at least one of the identified resource descriptions;
  generating a resources assessment corresponding to one or more entities based of the plurality of entities based at least in part on timetables of resources that indicate capacities to generate and make available resources with respect to particular times, the model, and a particular resource capacity of a particular resource type mapped to at least part of the platform components;
  generating an output corresponding to content derived from the resources assessment; and
  causing transmission of the output via the one or more interfaces to one or more client devices and/or the one or more resource-controlling systems to cause a load-balancing operation to execute a load transfer from a first entity to a second entity.

2. The method as recited in claim 1, where the causing transmission of the output is to the one or more client devices and is to cause presentation of a graphical representation formatted to represent at least a portion of one or both of the resources assessment and the event data.

3. The method as recited in claim 1, where the causing transmission of the output is to cause a load-balancing operation to execute a load transfer corresponding to at least part of the platform components from the first entity to a second entity in accordance with a load-balancing scheme so that the second entity provides at least the part of the platform components.

4. The method as recited in claim 3, further comprising:
  detecting a second electronic communication, received via the one or more interfaces, that indicates acceptance of the load transfer to the second entity.

5. The method as recited in claim 3, where the load-balancing operation is reactive to the event.

6. The method as recited in claim 3, where the load-balancing operation is based at least in part on a pattern of events corresponding to the event.

7. The method as recited in claim 1, where the identifying the one or more entities based at least in part on the event and the event type comprises:
  identifying a location corresponding to the event;
  determining a proximity threshold associated with the event type; and
  determining whether each respective location of each entity of a plurality of entities satisfies the proximity threshold with respect to the location corresponding to the event.

8. A system comprising:
one or more load-balancing processors that perform:
  detecting a first electronic communication, received via one or more interfaces, from a monitoring system;
  identifying an event indicated by event data of the first electronic communication, where the event is external to one or more resource-controlling systems and corresponds to a particular geolocation;
  consequent to the first electronic communication, performing load-balancing operations with respect to resources and a plurality of entities, the load-balancing operations comprising:
    selecting an event type of the event from a plurality of event types;
    identifying one or more entities based at least in part on the event, the event type, and the particular geolocation;
    identifying resource descriptions of resources assigned to the one or more entities, the resources comprising platform components specified by the resource descriptions with at least a resource identifier;
    identifying a model associated with at least one of the identified resource descriptions;
    generating a resources assessment corresponding to one or more entities based of the plurality of entities based at least in part on timetables of resources that indicate capacities to generate and make available resources with respect to particular times, the model, and a particular resource capacity of a particular resource type mapped to at least part of the platform components;
    generating an output corresponding to content derived from the resources assessment; and
    causing transmission of the output via the one or more interfaces to one or more client devices and/or the one or more resource-controlling systems to cause a load-balancing operation to execute a load transfer from a first entity to a second entity.

9. The system as recited in claim 8, where the causing transmission of the output is to the one or more client devices and is to cause presentation of a graphical representation formatted to represent at least a portion of one or both of the resources assessment and the event data.

10. The system as recited in claim 8, where the causing transmission of the output is to cause a load-balancing operation to execute a load transfer corresponding to at least part of the platform components from the first entity to a second entity in accordance with a load-balancing scheme so that the second entity provides at least the part of the platform components.

11. The system as recited in claim 10, the load-balancing operations further comprising:
  detecting a second electronic communication, received via the one or more interfaces, that indicates acceptance of the load transfer to the second entity.

12. The system as recited in claim 10, where the load-balancing operation is reactive to the event.

13. The system as recited in claim 10, where the load-balancing operation is based at least in part on a pattern of events corresponding to the event.

14. The system as recited in claim 8, where the identifying the one or more entities based at least in part on the event and the event type comprises:
  identifying a location corresponding to the event;
  determining a proximity threshold associated with the event type; and determining whether each respective location of each entity of a plurality of entities satisfies the proximity threshold with respect to the location corresponding to the event.

15. One or more non-transitory, machine-readable media storing instructions that, when executed by one or more processing devices, cause the one or more processing devices to perform:

detecting a first electronic communication, received via one or more interfaces from a monitoring system;

identifying an event indicated by event data of the first electronic communication, where the event is external to one or more resource-controlling systems and corresponds to a particular geolocation;

consequent to the first electronic communication, performing load-balancing operations with respect to resources and a plurality of entities, the load-balancing operations comprising:

selecting an event type of the event from a plurality of event types;

identifying one or more entities based at least in part on the event, the event type, and the particular geolocation;

identifying resource descriptions of resources assigned to the one or more entities, the resources comprising platform components specified by the resource descriptions with at least a resource identifier;

identifying a model associated with at least one of the identified resource descriptions;

generating a resources assessment corresponding to one or more entities based of the plurality of entities based at least in part on timetables of resources that indicate capacities to generate and make available resources with respect to particular times, the model, and a particular resource capacity of a particular resource type mapped to at least part of the platform components;

generating an output corresponding to content derived from the resources assessment; and causing transmission of the output via the one or more interfaces to one or more client devices and/or the one or more resource-controlling systems to cause a load-balancing operation to execute a load transfer from a first entity to a second entity.

16. The one or more non-transitory, machine-readable media of claim 15, where the causing transmission of the output is to the one or more client devices and is to cause presentation of a graphical representation formatted to represent at least a portion of one or both of the resources assessment and the event data.

17. The one or more non-transitory, machine-readable media of claim 15, where the causing transmission of the output is to cause a load-balancing operation to execute a load transfer corresponding to at least part of the platform components from the first entity to a second entity in accordance with a load-balancing scheme so that the second entity provides at least the part of the platform components.

18. The one or more non-transitory, machine-readable media of claim 17, the load-balancing operations further comprising:

detecting a second electronic communication, received via the one or more interfaces, that indicates acceptance of the load transfer to the second entity.

19. The one or more non-transitory, machine-readable media of claim 17, where the load-balancing operation is reactive to the event.

20. The one or more non-transitory, machine-readable media of claim 17, where the load-balancing operation is based at least in part on a pattern of events corresponding to the event.

* * * * *